(12) United States Patent
Modlin et al.

(10) Patent No.: US 6,173,609 B1
(45) Date of Patent: Jan. 16, 2001

(54) OPTICAL LEVEL SENSOR

(75) Inventors: Douglas N. Modlin, Palo Alto; Jan Frederik Jansen, deceased, late of Redwood City; by Renée Jansen, executor, San Jose, all of CA (US)

(73) Assignee: Optical Sensor Consultants, Inc., Lexington, MA (US)

( * ) Notice: Under 35 U.S.C. 154(b), the term of this patent shall be extended for 0 days.

(21) Appl. No.: 08/879,952

(22) Filed: Jun. 20, 1997

Related U.S. Application Data

(60) Provisional application No. 60/022,088, filed on Jun. 24, 1996.

(51) Int. Cl.⁷ .................................................... G02B 5/14
(52) U.S. Cl. ............................ 73/293; 250/577; 385/115
(58) Field of Search .................... 73/293, 36, 335.01; 250/574, 900, 577; 385/116, 9, 4, 115, 47, 28; 356/133, 436

(56) References Cited

U.S. PATENT DOCUMENTS

| | | | |
|---|---|---|---|
| 3,054,291 | * 9/1962 | Landwer | 73/293 |
| 3,068,697 | 12/1962 | Carlsen | 73/293 |
| 3,120,125 | * 2/1964 | Vasel | 73/293 |
| 3,417,614 | 12/1968 | Ryder | 73/327 |
| 3,448,616 | 6/1969 | Wostl et al. | 73/293 |
| 3,548,657 | * 12/1970 | Panerai et al. | 73/293 |
| 3,570,311 | 3/1971 | Nelson | 73/327 |
| 3,648,521 | 3/1972 | Amendolia | 73/293 |
| 3,780,295 | * 12/1973 | Kapron et al. | 250/199 |
| 3,794,428 | * 2/1974 | Giesecke | 356/156 |
| 4,156,149 | * 5/1979 | Vaccari | 250/577 |
| 4,252,403 | * 2/1981 | Salisbury | 350/96.15 |
| 4,311,048 | 1/1982 | Merz | 73/293 |
| 4,443,699 | * 4/1984 | Keller | 250/227 |
| 4,650,992 | 3/1987 | Ruhrmann | 250/227 |
| 4,745,293 | 5/1988 | Christensen | 250/577 |
| 4,870,292 | * 9/1989 | Alpert et al. | 250/577 |
| 4,880,971 | 11/1989 | Danisch | 250/227 |
| 4,942,306 | 7/1990 | Colbourne | 250/577 |
| 5,319,731 | * 6/1994 | Eastman | 385/115 |
| 5,320,814 | * 6/1994 | Walt | 422/82.07 |
| 5,412,749 | * 5/1995 | Sayegh et al. | 385/115 |

* cited by examiner

Primary Examiner—Daniel S. Larkin
Assistant Examiner—Michael Cygan
(74) Attorney, Agent, or Firm—Townsend and Townsend and Crew LLP

(57) ABSTRACT

An optical sensor (40) that provides a monotonic level-dependent output signal that varies smoothly and at an easily detectable rate over the entire length of the sensor includes first and second spaced waveguides (45, 50) extending along an axis, with each extending between its respective first and second ends. The first waveguide does not have surfaces contacting the liquid along the first waveguide's length. The second waveguide has at least a longitudinally extending portion of an outer surface in optical contact with the liquid. One or more web portions (50a, 50b, 50c) extend along and between both waveguides so that some of the light traveling along the first waveguide is coupled through the web portion(s) into the second waveguide. Light is injected into an end of the first waveguide (52), allowed to travel along the first waveguide, with a portion leaking into the second waveguide. Light is detected (55), with the amount representing the level of liquid.

15 Claims, 15 Drawing Sheets

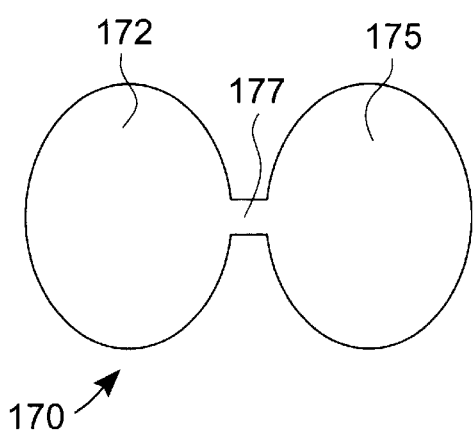
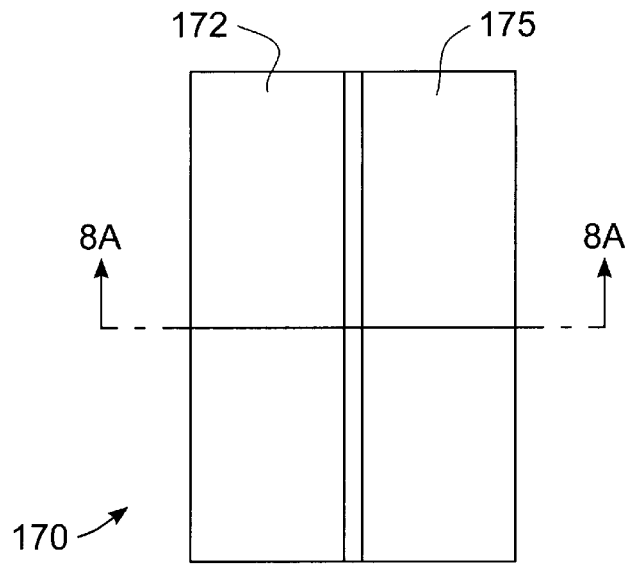
FIG. 8A               FIG. 8B
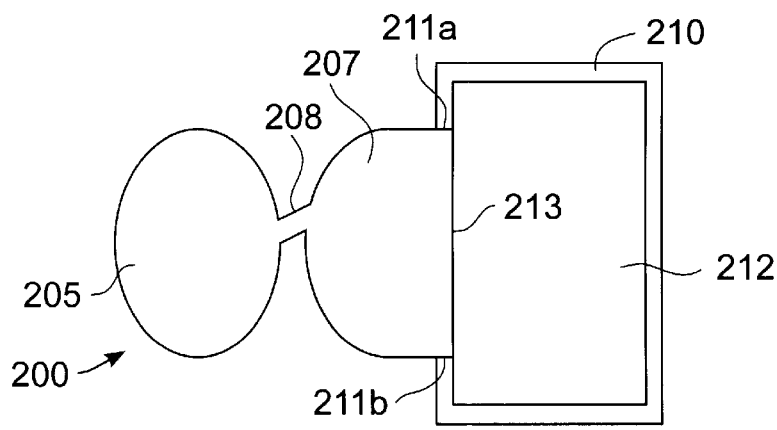
FIG. 9A
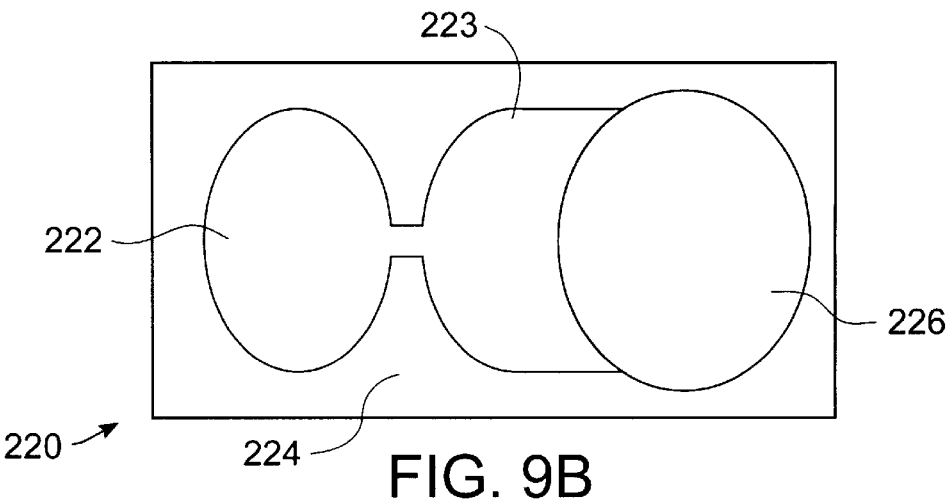
FIG. 9B

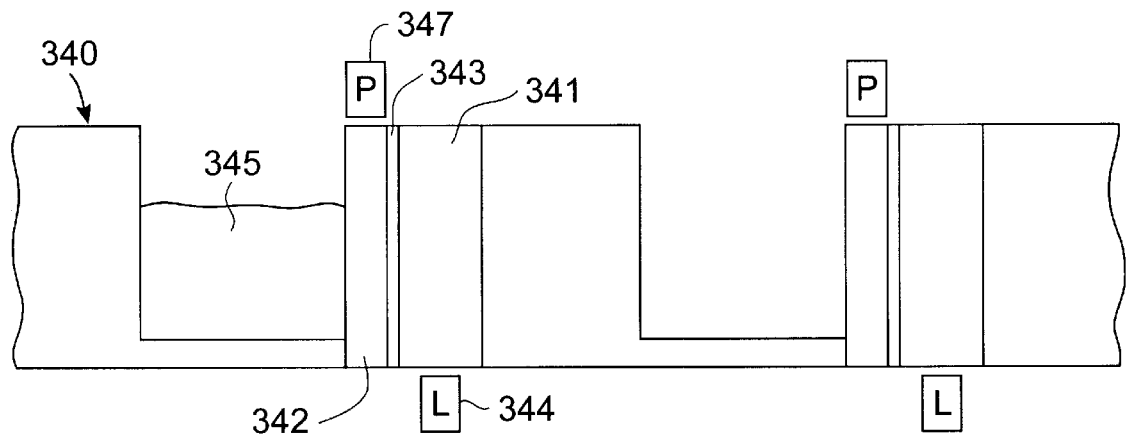
FIG. 10C
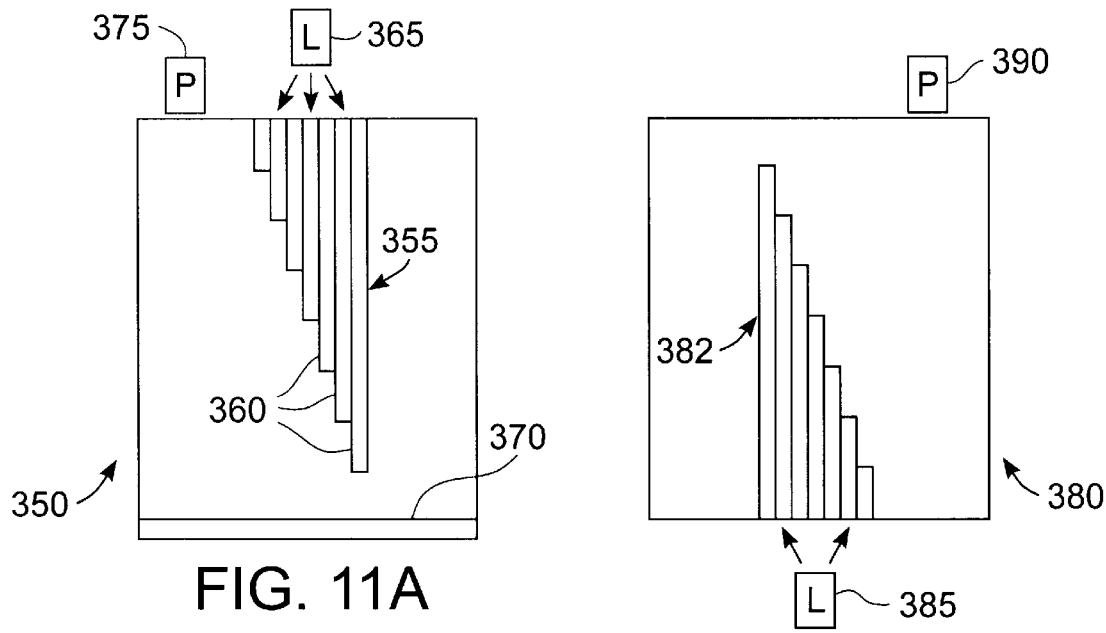
FIG. 11A
FIG. 11B
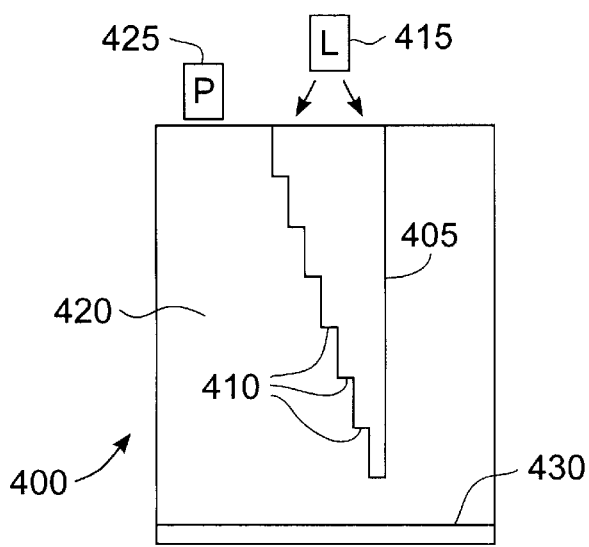
FIG. 12

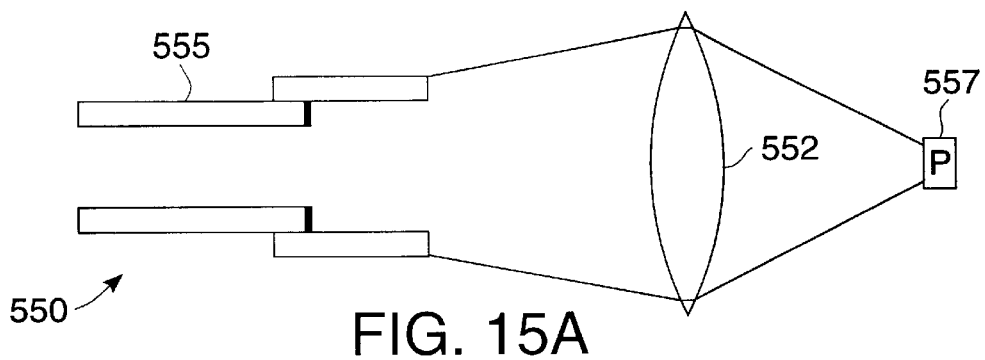
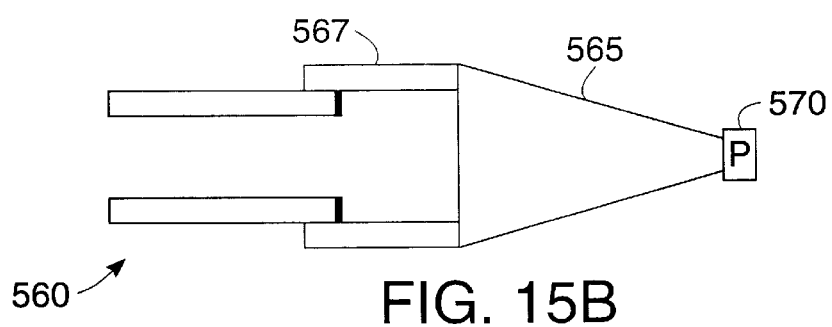
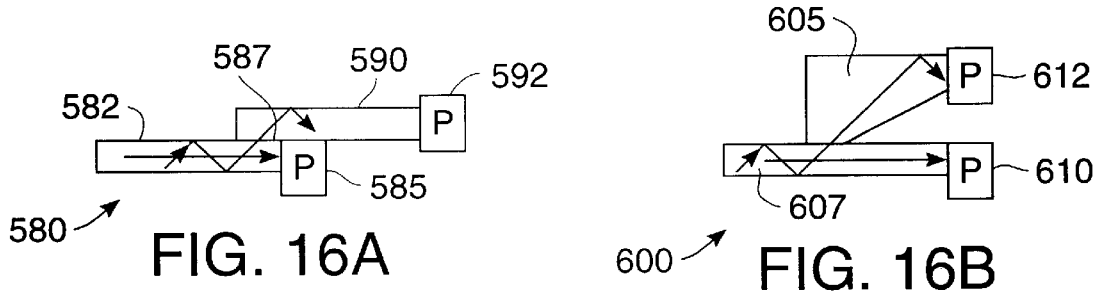
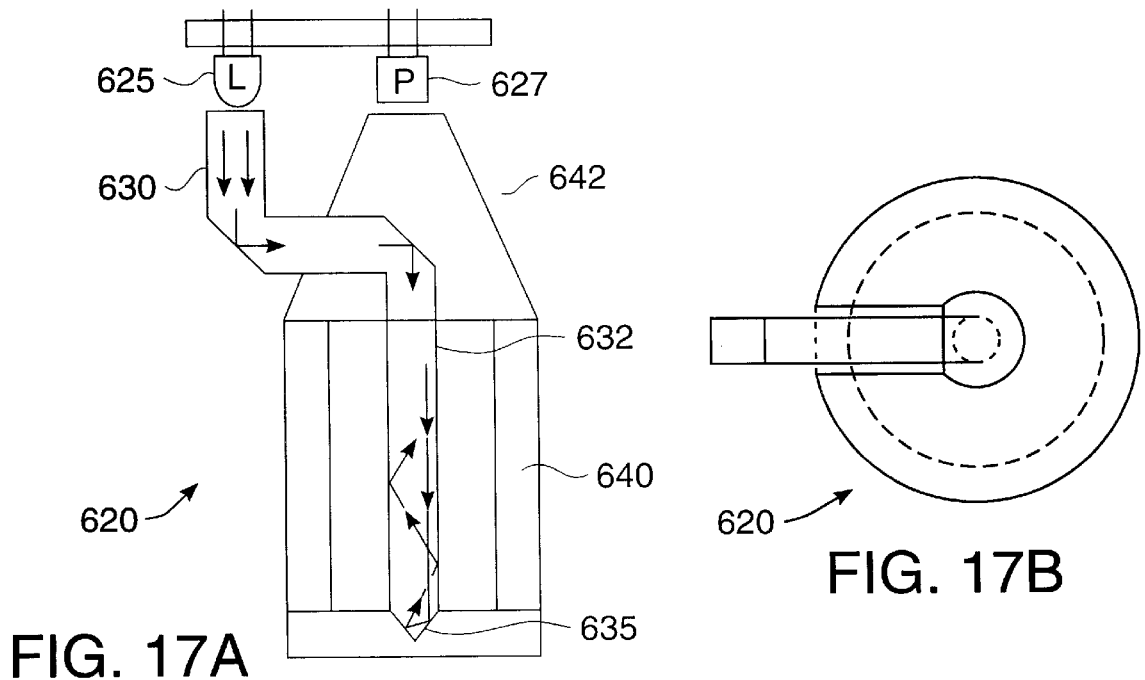

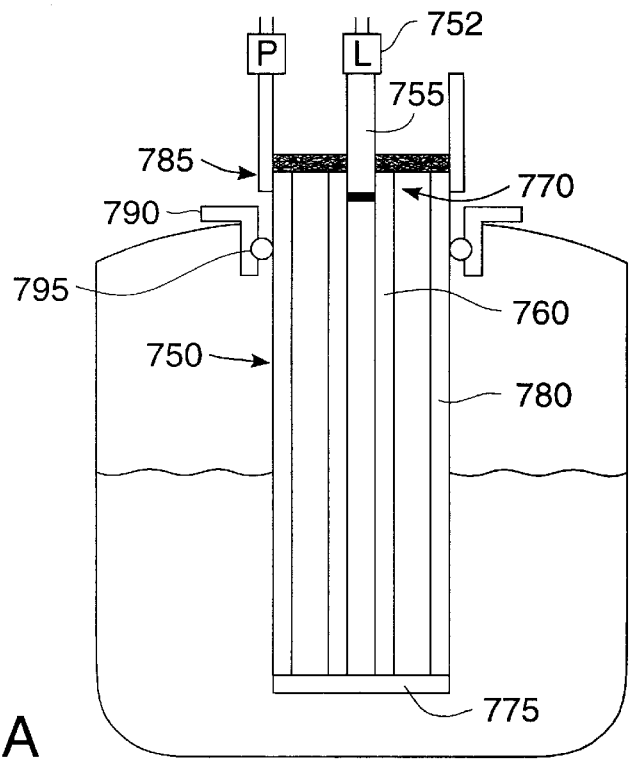
FIG. 21A
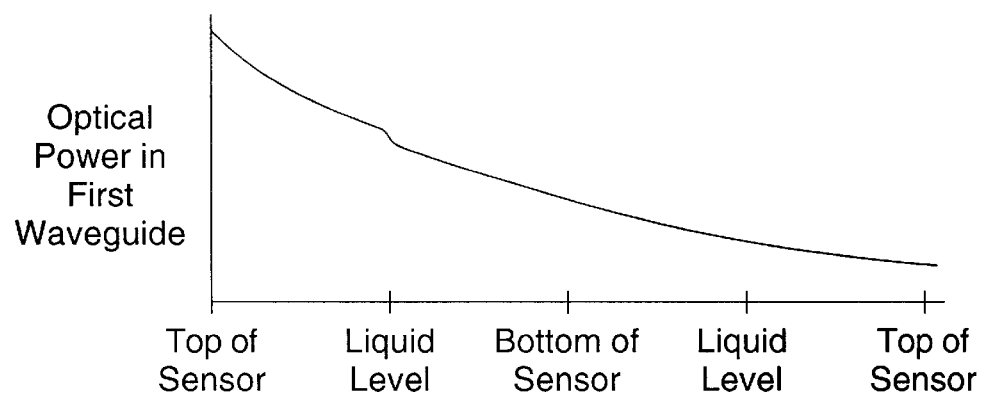
FIG. 21B  Distance Traveled by Light in First Waveguide
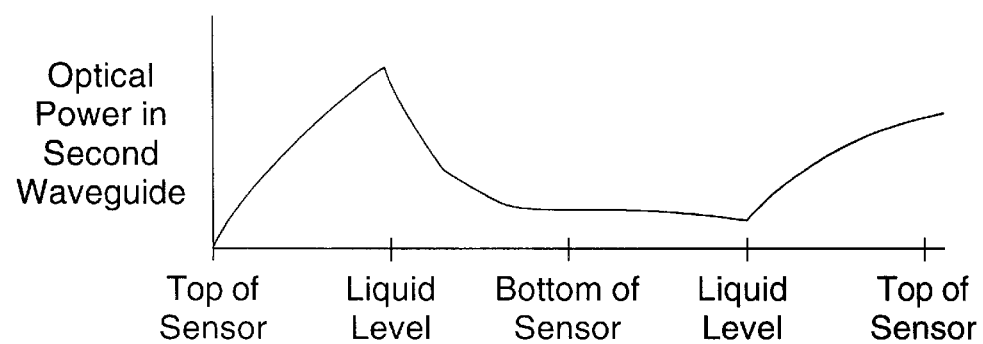
FIG. 21C  Distance Traveled by Light in Second Waveguide

OPTICAL LEVEL SENSOR

CROSS-REFERENCE TO RELATED APPLICATIONS

This application is related to the following U.S. Provisional Application, the disclosure of which is incorporated by reference in its entirety for all purposes:

Application Ser. No. 60/022,088, filed Jun. 24, 1996.

BACKGROUND OF THE INVENTION

The present invention relates generally to level sensors, and more specifically to optical level sensors that generate a measurement based on light escaping from a waveguide over a portion of the waveguide that is submerged in liquid. In the context of this application, the term liquid will be used to denote any material capable of establishing optical contact with the waveguide (e.g., common liquids such as water, fuels, solvents, process chemicals, acids, bases, and reagents, as well as food stuffs, froths, foams, gels, suspensions, and miscellaneous mixtures, slurries, etc.).

Currently, there are many different types of liquid level sensors commercially available. Each different type operates on different physical principles and has particular advantages and disadvantages in specific applications.

Liquid level sensors for chemical and fuel storage tanks have traditionally employed float-based systems, although in recent years, sensors based on electronic transduction methods have been developed (e.g., capacitance-based sensors). Float-based sensors continue to be the most widely used in commercial applications due to their low cost and entrenched market position. Even though capacitive sensors offer higher reliability in demanding environments (e.g., high levels of vibration, shock, etc.), their relatively high cost has slowed their rate of adoption in applications such as trucks and busses. Additionally, in demanding liquid storage tank applications such as aircraft fuel, corrosive liquids, solvents, high purity chemicals, and bio-chemical reagents, the relatively limited performance, high cost, and poor material compatibility of both float-based and electronic sensors have restricted the utilization of these level sensing technologies.

A practical optical level sensor would offer several inherent advantages in the applications described above. In an optical sensor, no electrical contact is made with the liquid. Additionally since no electrical conductors enter the liquid storage area, there is no risk that electrical conductors could contact the liquid even if the sensor body were to experience mechanical failure. Furthermore, optical sensors have no moving parts and therefore exhibit minimal hysteresis. Moreover, in many cases, due to their simpler construction and no moving parts, optical sensors can be fabricated with materials (e.g., glasses and specialty plastics) that are suitable for use with both high purity chemicals and reagents as well as with aggressive solvents, acids, and corrosives. An optical sensor can be made at relatively low cost in certain applications due to simplified fabrication methods and the use of inexpensive materials.

Prior art optical level sensors have suffered from several problems that have made it difficult to produce a low cost, linear, and accurate level sensor that functions reliably in storage tanks of various sizes for a wide range of liquids. Prior art sensors have been susceptible to fouling from environmental contaminants and the formation of biofilms on their surfaces which spoil their calibration. Additionally, prior art devices have generally suffered from inherent design limitations which severely compromise accuracy and sensitivity when the sensor's length exceeds six inches to one foot.

FIG. 1A shows a representative prior art optical sensor 10 of the type that detects the level of a liquid 12 contained in a tank 15 utilizing light propagation in a waveguide. The sensor exploits the difference in index of refraction between the gas and liquid phases in contact with the probe as the transduction mechanism. The sensor includes a vertical rod 20 of optically transmissive material (such as plastic) having an index of refraction N1. The rod is illuminated from the top by a light source 25 with a mirror 27 on the end nearest the bottom of the tank. A detector such as a photodiode 30 is positioned to measure the light traveling upward after being reflected by the mirror.

The light launched from the light source propagates inside the rod and will be contained within the rod at the boundary between the rod and the external medium (index of refraction N2) by total internal reflection as long as the angle of propagation of the light relative to the longitudinal axis of the rod is less than the critical angle $\theta_c$, where:

$$\theta_c = \cos^{-1}(N2/N1). \tag{1}$$

At the point where the rod is immersed in the liquid, the index of refraction in the external medium increases dramatically, and a fraction of the light traveling at angles greater than $\theta_c$ will be allowed to propagate into the external medium. If the tank is empty, most of the light launched into the rod is reflected and returned to the photodetector. If the tank is full, most of the light is transmitted into the tank if the refractive index of the fluid is relatively well matched to that of the rod.

FIG. 1B illustrates an inherent problem and limitation with this design, namely that the returned light level drops through about 95% of its range when the liquid level rises above the mirror at the end of the rod by a distance 2 diameters of the length of the rod. The data of FIG. (1B) are taken for the case where the rod is acrylic plastic (index= 1.49) having a diameter of 0.5" and a length of 18.375" and is immersed in diesel fuel having an index of refraction of 1.47. FIG. 1C shows that, for this example, the sensor output will have transitioned through over 90% of its range when the tank is filled to 5% of its capacity.

Numerous schemes and physical embodiments have been proposed to provide an output that is linearly proportional to the liquid level and thus can be read directly on an output device such as a panel gauge (e.g., silver coating with a tapered slot, contoured surface profile). Generally, embodiments that include such structural features for providing a linear response result in increased physical complexity (and thus increased manufacturing complexity and cost) as well as increased susceptibility to adverse interactions with the liquid being sensed (e.g., contamination of the liquid, extreme sensitivity to the viscosity of the liquid, failure of the sensor due to action of the liquid, and failure of the sensor due to environmental stresses in the tank, etc.). Furthermore, provision for linearization alone does not guarantee that the sensor will remain calibrated over its useful lifetime if any significant degree of component drift or fouling occurs. Fouling refers to the buildup over time of surface contaminants which affect the performance of the sensor by causing absorption of light at the surface or in the bulk materials or by otherwise altering the index of refraction at the sensor/liquid interface or within the bulk materials.

It should also be noted that the signal does not drop to zero when the tank is full, although a drop to zero would be the ideal situation. The tank-full background signal arises from several sources: light scattering by imperfections along the rod, back-reflection from refractive index fluctuations at light coupling interfaces, total internal reflection of shallow angle rays when the index of liquid is lower than that of rod, and direct reflection by the mirror of light traveling below the critical angle and/or near parallel to the axis of the rod. The net effect is that a fraction of the excitation light is reflected back to the photodetector and appears as a background signal which must be subtracted in order to achieve an accurate calibration. For the data shown in FIG. 1C, the relatively large background signal level compared to the near-full signal and the highly nonlinear change in signal with distance along the probe make this an impractical solution. Even though the large background signal can be subtracted in principle, unacceptable calibration errors will develop over time if the background signal changes. Thus it is important to minimize the background signal in order to minimize long term calibration drift.

In the case where the refractive index of the fluid is equal to or greater than that of the rod, all of the light escapes when the light traveling in the waveguide encounters the portion immersed in the liquid. This is the most desirable case, although it is difficult to achieve in practice. In a typical situation, the index of the rod is larger than that of the liquid. For the case of FIG. 1B, the critical angle is found to be 9.4° using equation (1). Light traveling at angles less below 9.4° will be not propagate into the liquid and will be returned to the detector. For light traveling at greater than 9.4°, the fraction of the incident energy which escapes into the liquid increases with the angle of propagation and is also dependent on the polarization of the light relative to the interface.

Fresnel's equations can be used to calculate the fraction of the energy transmitted by a randomly polarized beam of light traveling an internal medium with index N1 at a given angle of propagation, $\alpha$, into an external medium with index N2 at an angle $\beta$. FIG. 2 illustrates the angular relationships between the reflected and refracted beams at a dielectric interface for the cases where N1>N2 and N1<N2. Fresnel's equations are commonly written in the form:

$$R_{par}=\sin^2(\alpha-\beta)/\sin^2(\alpha-\beta) \quad (2)$$

and $$R_{perp}=\tan^2(\alpha-\beta)/\tan^2(\alpha-\beta) \quad (3)$$

where $R_{par}$ and $R_{perp}$ refer to the internal reflectance of the parallel and perpendicular polarized components, respectively. The effective fraction of the energy transmitted is given by:

$$T_{effective}=1-(R_{par}+R_{perp})/2 \quad (4)$$

The transmission at the waveguide/liquid interface ($T_{effective}$) is plotted in FIG. 3 for a liquid level sensor waveguide with light propagating at several selected angles. It should be noted that the propagation angle, $\theta$, is measured relative to the optical axis and refers to equation (1). While ideally the index of refraction of the waveguide should chosen to be equal to or greater than that of the liquid, this may not be possible given available materials. From FIG. 2, it is clear that if the propagation angle exceeds the critical angle by a sufficient margin, the transmission will be very high. For example, a liquid level sensor with a waveguide index of 1.49 in water (index 1.33) will transmit >99% of the light traveling at 45° into the water. What is important is to insure that the majority of light traveling in the waveguide and/or the fraction thereof coupled to the photodetector from the waveguide is at a relatively steep angle compared to the critical angle. If a large fraction of the energy received by the photodetector travels at a relatively shallow angle relative to the critical angle, then the signal-to-background ratio and the sensitivity of calibration to changes in operating conditions will be undesirably high. Prior art sensors have not generally addressed this problem in a fashion that allows the design of practical level sensors with commercially available materials that are compatible with the sensed liquid but have an index of refraction that is greater than that of the liquid.

SUMMARY OF THE INVENTION

The present invention provides an optical sensing method and sensor that provide a monotonic level-dependent output signal that varies smoothly and at an easily detectable rate over the entire length of the sensor. The present invention provides several alternative methods for linearization and calibration of the output signal for the optical level sensor embodiments described herein. The present invention greatly improves the linearity and accuracy, reduces the signal-to-background ratio and drift, and achieves a high level of chemical compatibility while maintaining a relatively low manufacturing cost.

A method of sensing the level of liquid (as defined in the first paragraph of the Background section) according to the invention uses a waveguide having first and second ends spaced along an axis. The axis can be considered normally vertical with one end of the waveguide at the top and the other end at the bottom (in the liquid). The waveguide has a surface for contacting the liquid. The method includes injecting light into the waveguide for travel in a direction having a component along an axis extending from the first end to the second end, and detecting an amount of light reaching an end of the waveguide. However, the light is injected into the waveguide at locations along a significant length of the waveguide. The method may further include converting a signal representing the amount of light, so detected, to a representation of the level of contacting liquid.

An optical sensor according to an embodiment of the invention comprises first and second spaced waveguides extending along an axis, with each extending between its respective first and second ends. The first waveguide does not have surfaces contacting the liquid along the first waveguide's length. The second waveguide has at least a longitudinally extending portion of an outer surface in optical contact with the liquid ("liquid-contacting surface"). One or more web portions extend along and between both waveguides so that some of the light traveling along the first waveguide is coupled through the web portion(s) into the second waveguide. Conversely, some of the light traveling along the second waveguide is coupled through the web portion(s) into the first waveguide.

In some specific embodiments, the second waveguide is generally tubular and surrounds the first waveguide. In other specific embodiments, the two waveguides are side-by-side. The waveguides may be formed as a unitary extrusion or molded part, or as two separate extrusions or molded parts, with the web portions integrally formed on one or the other or otherwise caused to be in intimate (optical) contact with one and other. For example, the two waveguides may be optically joined by solvent welding, epoxy adhesives, photo-curable adhesives, ultrasonic welding, co-extrusion, insert molding, or other known techniques for bonding or otherwise causing intimate physical and optical contact between plastic materials for those embodiments that are made of plastic (e.g., acrylic, polycarbonate, clear polystyrene, nylon, etc.). Glasses or glass-like materials may also be used either entirely or as the second waveguide in combination with a plastic first waveguide, since the materials provide superior chemical resistance and higher temperature capability. Numerous techniques and adhesives are available to provide intimate physical and optical contact between glass and glass or between glass and plastic. For example index of refraction matching solutions or gels, precision press-fits, epoxies, clear fluoropolymers and silicones, photo-curable adhesives, and other optical adhesives can be used successfully.

Light traveling along the second waveguide over a portion where the liquid is contacting the outer surface is rapidly lost. Light traveling along the second waveguide over a portion where there is no liquid contacting the outer surface remains trapped by total internal reflection (although some is coupled back into the first waveguide).

Light is injected into an end of the first waveguide, allowed to travel along the first waveguide, with a portion leaking into the second waveguide. Light is detected, with the amount representing the level of liquid. Different embodiments are characterized by different locations of the source and the detector, different shapes of the first and second waveguides, and whether the waveguides have reflectors at their ends remote from the source. It is often preferred to have the source and detector(s) at the top end of the waveguides. In such embodiments, the bottom end of one or both of the waveguides will have a reflector. The reflector may be a specular reflector, a diffuse reflector, or a retroreflector.

The invention achieves the benefit of a smooth and easily detectable variation of the output signal with liquid level by ensuring that light is being introduced (for example, via the web mechanism) into the second waveguide over substantially the second waveguide's length. Therefore, the relative cross-sectional dimensions of the web portion(s) can be tailored to the length of the sensor to ensure that a reasonable portion of the excitation light remains at the end of the light's travel in the first waveguide and hence improve the range capability (i.e., the ability to fabricate long sensors) and linearity of the sensor over the range.

Additional enhancements include placement of sources and or detectors at various locations internal or external to one or both of the waveguides for the purposes of calibration and/or improved linearization or to provide alternative embodiments which may be better suited to a particular application. Signals from combinations of the sources and detectors can be combined using ratiometric or other more sophisticated algorithmic methods to provide in-situ linearization and hence provide accurate calibration by providing real-time compensation for component drift and aging as well as for sensor surface fouling. In some embodiments, the amount of light traveling in different propagation modes (i.e., angle of the light relative to the longitudinal optical axis) along both waveguides is detected and a ratio is used to account for the fact that the light source output or detector response may drift over time or under different operating conditions.

Additional embodiments include input and output mode-selective couplers to exclude or allow specific modes from entering or exiting the first and/or the second waveguide. In some embodiments, output mode-selective couplers exclude rays traveling at shallow angles from exiting the second waveguide and into the detector. An output mode-selective coupler both reduces the background signal and allows the second waveguide to be fabricated from a material having a higher index of refraction than the sensed liquid. In some embodiments, two output mode-selective couplers are used to select low-order and high-order modes, i.e., light rays with shallow and steep propagation angles, respectively, which when detected with two photodetectors can be used to derive a signal that is relatively insensitive to light source output changes, waveguide attenuation drift, and temperature drift by combining the signals from the two photodetectors algorithmically (e.g., taking the ratio, etc.).

Additional embodiments include a first waveguide partially surrounded by a low-index cladding material as in an optical fiber, or a highly reflective coating which is embedded in a second waveguide. The second waveguide may be generally tubular and completely surround the first waveguide and it must contact the first (cladded or coated) waveguide over a portion of its surface where the cladding or coating is not present. The cladding or reflective coating on the first waveguide is interrupted in such a way so as to allow light from the first waveguide to be injected into the second waveguide at locations along a significant length of the second waveguide so as to provide a monotonic level-dependent output signal that varies smoothly and predictably over the length of the sensor. In some embodiments, the low-index cladding surrounding the first waveguide is made up of a one or more low-index materials which directly contact the first waveguide along portions of its surface with a longitudinal gap in the cladding provided so as to allow the second waveguide to directly contact the first waveguide through the gap in the cladding. In other embodiments, the first waveguide is coated with a highly reflective material, like silver, along its surface with a longitudinal gap in the reflective coating provided so as to allow the second waveguide to directly contact the first waveguide through the gap in the reflective coating.

The sensor can be utilized in numerous applications beyond level sensing in tanks including level sensing from remote locations using fluid coupling to the actual storage tank, embedded level sensing applications in micro-well plates, and fluid delivery systems where it is desired to continuously monitor liquid level and/or flow rate such as intravenous fluid delivery systems and process chemical storage and delivery systems.

In an additional embodiment, the first waveguide consists of a plurality (or bundle) of smaller diameter optical fibers (relative to the overall diameter of the first waveguide), each with successively shorter lengths. Light is coupled into the bundle from a light source and is injected into the second waveguide as the coupled light exits through the end of each of the optical fibers which comprise the first waveguide. Alternatively, instead of a bundle of optical fibers, the first waveguide is fabricated so as to embody periodic steps or surface facets, the angle of which with respect to the longitudinal optical axis exceed the critical angle for light traveling in the first waveguide and thus through which light escapes and is injected into the second waveguide at numerous locations along a significant length of the second waveguide so as to provide a monotonic level-dependent output signal that varies smoothly and predictably over the length of the sensor.

A further understanding of the nature and advantages of the present invention may be realized by reference to the remaining portions of the specification and the drawings.

BRIEF DESCRIPTION OF THE DRAWINGS

FIGS. 8A and 8B are transverse and longitudinal cross-sections of an embodiment of the present invention wherein the first and second waveguides are side-by-side;

FIGS. 9A and 9B are transverse cross-sections of embodiments where a low index material holds the liquid in contact with a portion of the surface of the second waveguide;

FIGS. 10B and 10C are top and cross-sectional views, respectively, of an embodiment of the present invention where sensors as shown in FIG. 9B are embedded into a 96-well micro-well plate;

FIGS. 11A and 11B are longitudinal cross-sections of an embodiment of the present invention with its first waveguide comprising a plurality of optical fibers;

FIG. 12 is a longitudinal cross-section of an embodiment of the present invention with a first waveguide having a stepped cross-sectional profile;

FIGS. 15A and 15B show alternative embodiments of mode-selective couplers at the output of a level sensor according to the present invention where the output light is concentrated and directed to a single photodetector;

FIGS. 16A and 16B show examples of mode-selective couplers that provide for separate signals derived from shallow and steep angle rays traveling in the second waveguide;

FIGS. 17A and 17B show an embodiment of a mode-selective coupler at the output of the sensor where the output light is concentrated and directed to a single photodetector, with collimated input light being directed from a light source via a light guide through a slot in the mode-selective coupler;

FIG. 21A shows an embodiment of the present invention utilizing input and output mode-selective couplers and a mirror on the bottom end of the sensor;

FIGS. 21B and 21C are a set of qualitative curves illustrating the optical energy profile along the longitudinal axis of a sensor embodiment of the present invention for a round trip of light emitted from the light source, reflected from a mirror at the end of the sensor, and returned to the photodetector.

DESCRIPTION OF SPECIFIC EMBODIMENTS

In the embodiments to be described below reference will be made to a light source and a photodetector. The term light source shall be used to denote an LED, laser, laser diode, or any other solid state light source, incandescent or fluorescent lamp, or an optical fiber connected to a remote light source. The term photodetector shall be used to denote a photodiode made from a semiconductor such as silicon or germanium, a semiconducting photocell of any generic composition, or any other device which converts photonic input to electronic output.

Embodiments with Coaxial Waveguides

Figure 4A:
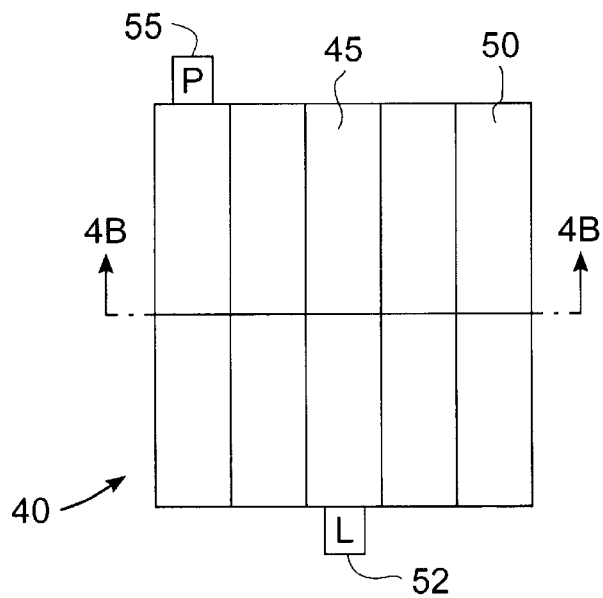
FIG. 4A is a schematic diagram of an embodiment of the present invention wherein a cylindrical first waveguide is surrounded by a tubular second waveguide with webs located at angles of 120° from each other.

FIG. 4A is a schematic diagram of a sensor 40 according to an embodiment of the present invention made up of a rod-shaped first (inner) waveguide 45 which is in intimate physical and optical contact with a tube-shaped second (outer) waveguide 50. Excitation light is launched into the first waveguide from a light source 52 located at the bottom of the first waveguide. Light exiting from the top end of the second waveguide is detected by a photodetector 55.

Figure 4B:
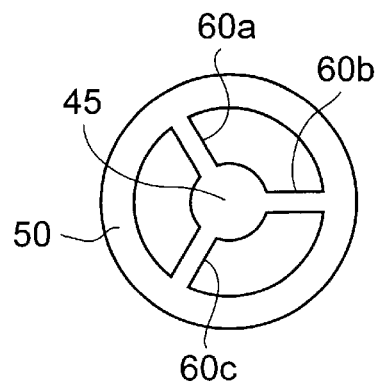
FIG. 4B is a schematic diagram of the cross-section of the embodiment of the present invention indicated in FIG. 4A.

FIG. 4B is a schematic diagram of the cross-section of sensor 40. Here, three webs 60a, 60b, and 60c provide the physical connection and optical contact between the rod-shaped first waveguide and the tube-shaped second waveguide. A fraction of the excitation light launched into first waveguide 45 is injected into second waveguide 50 by webs 60a, 60b, and 60c along the entirety of its length. The width of the webs should ideally be small compared to the circumference of the first waveguide so that the "injection rate" of the light traveling in the first waveguide into the second waveguide will be low enough so as to insure that the amplitude of the signal arising from light reaching the photodetector is easily detectable above the signal due to background light and electronic noise in the detector circuit.

Figure 5A:
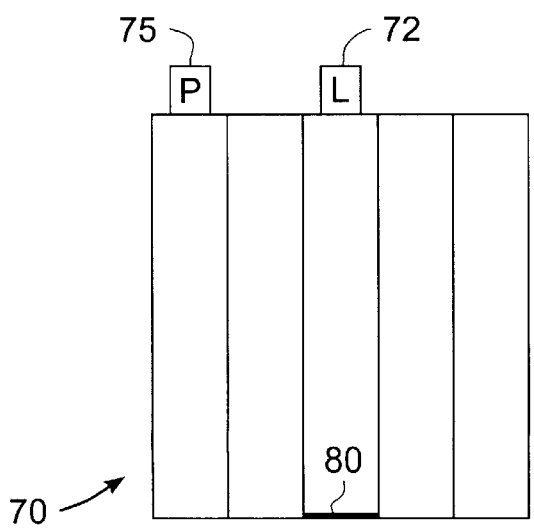
FIGS. 5A and 5B are longitudinal cross-sections of alternative embodiments of the present invention wherein light sources and detectors are placed in various locations.

FIG. 5A shows an embodiment of a sensor 70 that is suitable when it is desired to mount a level sensor in a penetration through the top of the tank. Sensor 70 has the light source 72 at the top of the first waveguide, the detector 75 at the top of the second waveguide, and a reflector 80 at the bottom of the first waveguide. While some of the downwardly traveling light injected into the first waveguide is coupled into the second waveguide through the webs, it is generally lost, either out the portion of the liquid-contacting surface that is immersed or out the bottom. However, the light in the first waveguide that reaches the bottom is reflected upwardly, and acts like a source mounted to the bottom of the first waveguide as in the embodiment in FIG. 4A above.

The reflector may be a specular reflector, a diffuse reflector, or a retro-reflector. A variant of the embodiment of FIG. 5A has a reflector on the bottom of the second waveguide as well as on the bottom of the first waveguide.

Figure 5B:
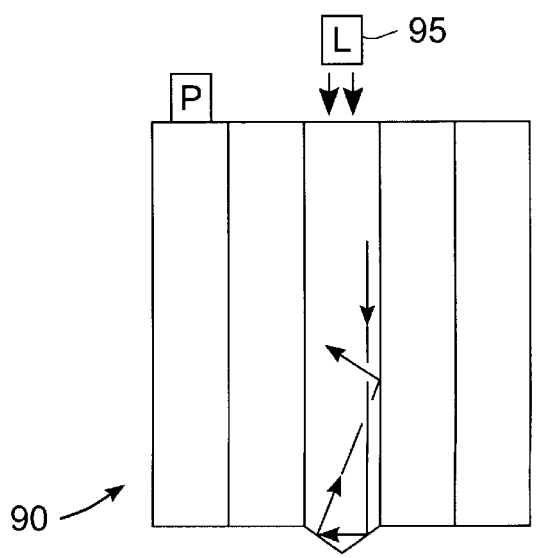

FIG. 5B shows an embodiment of a sensor 90 where the excitation light is launched into the first waveguide in a collimated beam (e.g., from a lensed LED or laser 95) and travels to the end where it encounters a conical reflector 97. The reflector cone angle $\theta_R$ is set to reflect the excitation beam back into the first waveguide at an angle, $\theta_{EX}$, which exceeds the critical angle between the second waveguide and the liquid. For example, if $\theta_{Ex}$ is chosen to be 45°, OR is calculated to be 33.75° from the relation $\theta_R=(180°-\theta_{EX})/4$. This embodiment is suitable for longer sensor lengths since less excitation light is lost to the second waveguide as it travels to the reflector. If a laser is used for the light source, this embodiment can be used to fabricate sensors with lengths ranging to tens of meters.

In addition to those shown in FIGS. 5A and 5B, other embodiments of the present invention can be realized using different strategies for injecting the excitation light and detecting the output. A number of these are listed in Table 1 below:

TABLE 1

| Top of sensor | | Bottom of sensor | |
| --- | --- | --- | --- |
| first waveguide | second waveguide | first waveguide | second waveguide |
| inject | detect | reflector | no reflector |
| inject | detect | reflector | reflector |
| inject/detect | detect - ratio | reflector | reflector |
| inject/detect | detect - ratio | reflector | no reflector |
| inject | no reflector | no reflector | detect |
| inject | no reflector | detect | no reflector |
| no reflector | detect | inject | no reflector |

The embodiments described above have the first waveguide implemented as a rod having a circular cross-section (i.e., a cylinder) and the second waveguide implemented as a coaxial tube with an annular cross-section (i.e., a cylindrical shell). Other geometries are possible. For example, the cross-sections need not be circular, but may include polygonal configurations such as square and triangular. Further, while it is often preferred, from a performance point of view, that the first waveguide be a solid rod, manufacturing considerations might militate toward making the first waveguide with a hollow bore (i.e., as a tube).

Figure 6A:
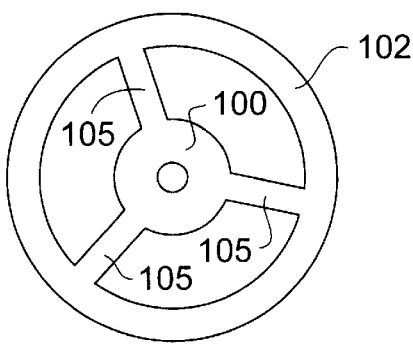
FIGS. 6A–6C are transverse cross-sections of alternative configurations of the first and second waveguides and their interconnecting webs.
Figure 6B:
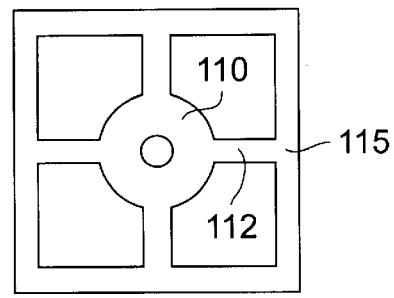
Figure 6C:
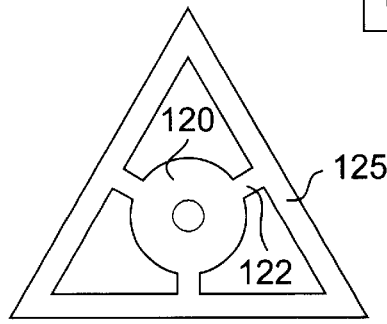

FIGS. 6A–6C are transverse cross-sections of alternative embodiments of the present invention illustrating various possible relationships between the first and second waveguides and their connecting web portions. In FIG. 6A, the first and second waveguides 100 and 102 are cylindrical tubes coupled by three webs 105. In FIG. 6B, the first waveguide is a circular tube 110 suspended by four webs 112 inside a square tube 115 defining the second waveguide. In FIG. 6C, the first waveguide is a circular tube 120 suspended by three webs 122 inside a triangular tube 125 defining the second waveguide. Many of the possible combinations can be described with the first waveguide being formed by either a square rod or tube, a circular rod or tube, or a triangular rod or tube, and the second waveguide being formed as a square, circular, or triangular tube, which is connected to the first waveguide by between one and four webs. Other embodiments consisting of alternative combinations of shapes for the first and second waveguides can also be used to implement the functions of the first and second waveguides and the webs as described above. The choice of a particular shape will be dictated primarily by specific requirements of a each application such as length, resolution, cost, and method of manufacture.

Figure 7A:
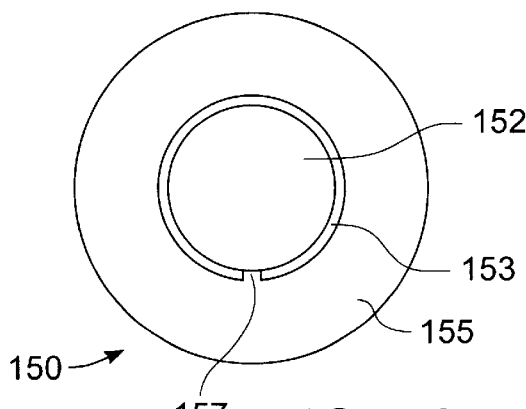
FIGS. 7A–7E are transverse and longitudinal cross-sections of an embodiment of the present invention wherein the first waveguide is connected to the second waveguide through a gap or perforation in a low-index cladding or reflective layer which surrounds the first waveguide.
Figure 7B:
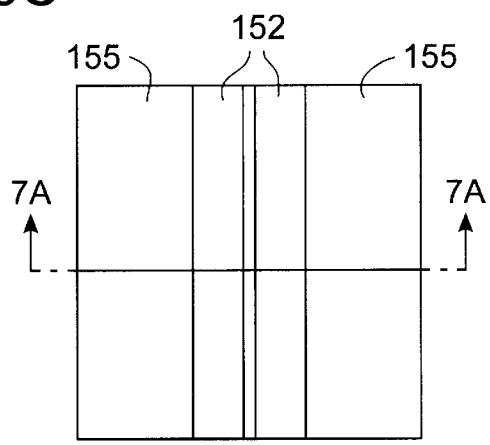
Figure 7C:
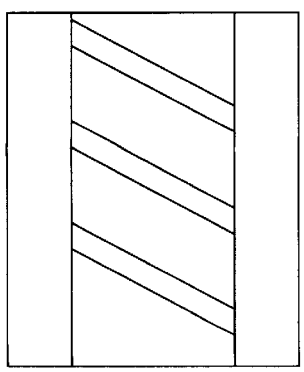
Figure 7D:
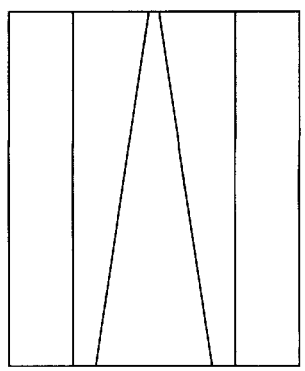
Figure 7E:
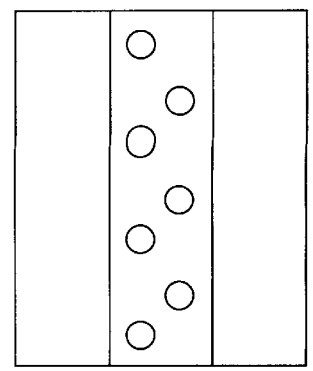

FIG. 7A is an axial cross-section of a sensor 150 according to an embodiment of the present invention wherein the first waveguide 152 with index N1 is coated with a cladding 153 having a low-index N2, similar to that of an optical fiber where N2<N1, with the first waveguide connected to the second waveguide 155 via an interconnecting web of solid material 157 which passes through a gap in cladding 152. FIGS. 7B, 7C, and 7D show cases where the cladding gap is constant and straight, constant and spiraled, and straight and tapered, respectively, over the length of the sensor. (Each of these cases will have somewhat different response characteristics due to the rate at which light is allowed to leak from the first to the second waveguide through the interconnecting web portion. For example, the tapered cladding gap shown in FIG. 7D can, in principle, be designed to provide a linear response.) FIG. 7E shows an embodiment wherein the connection between the first and second waveguide consists of a plurality of round perforations, however in principle, the perforations can be of any shape and can be spaced at any intervals designed to produced any desired sensor response including linear, exponential, and the like.

Embodiments with Side-by-side Waveguides

FIG. 8A is a transverse cross-section of a sensor 170 according to an embodiment of the present invention wherein the first waveguide 172 is in a side-by-side arrangement with the second waveguide 175, and the waveguides are connected mechanically and optically coupled through a web 177. While only one web is shown, multiple webs may be used. FIG. 8B is a longitudinal cross-section of the embodiment shown in FIG. 8A. The liquid contacts the second waveguide over at least a portion of its outer surface while the first waveguide is surrounded by a low index material (such as air).

FIG. 9A is a transverse cross-section of a sensor 200 according to an embodiment of the present invention. Sensor 200 has first and second waveguides 205 and 207 and functions in the same manner as the embodiment of FIG. 8A. However, a low-index material 210 contacts the second waveguide at locations 211a and 211b to define a chamber to maintain the liquid 212. The liquid contacts the second waveguide along an intervening flat surface portion 213. Material 210 may be a plastic having an index of refraction lower than that of the second waveguide. In the embodiment of FIG. 9A, web 208, which provides the optical connection between the first and second waveguides 205 and 207 is oriented at a small angle with respect to the flat surface portion 213 to minimize back-reflection of light into the first waveguide from the second waveguide.

FIG. 9B is a transverse cross-section of a sensor 220 according to an embodiment of the present invention. Sensor 220 has first and second waveguides 222 and 223 and functions in the same manner as the embodiment of FIG. 9A. However, the waveguides are embedded in a material 224 of lower index of refraction, such as plastic which also forms a cavity 226 continuing the liquid.

Figure 9C:
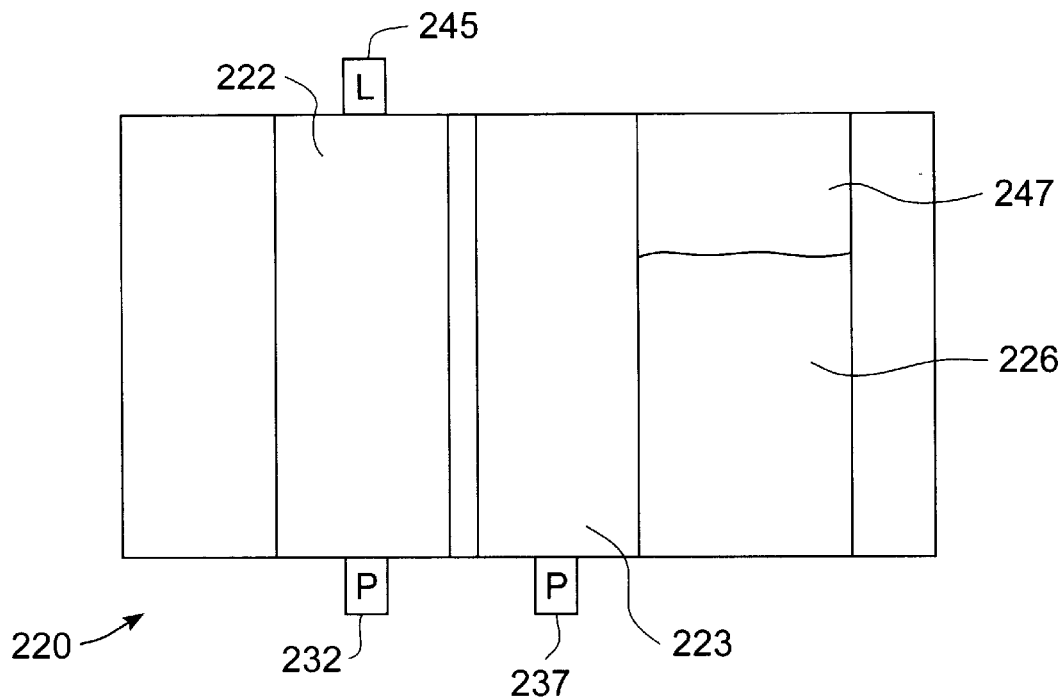
FIGS. 9C and 9D are longitudinal cross-sections of the embodiment of FIG. 9B, but with the light source and photodetector in alternative locations.
Figure 9D:
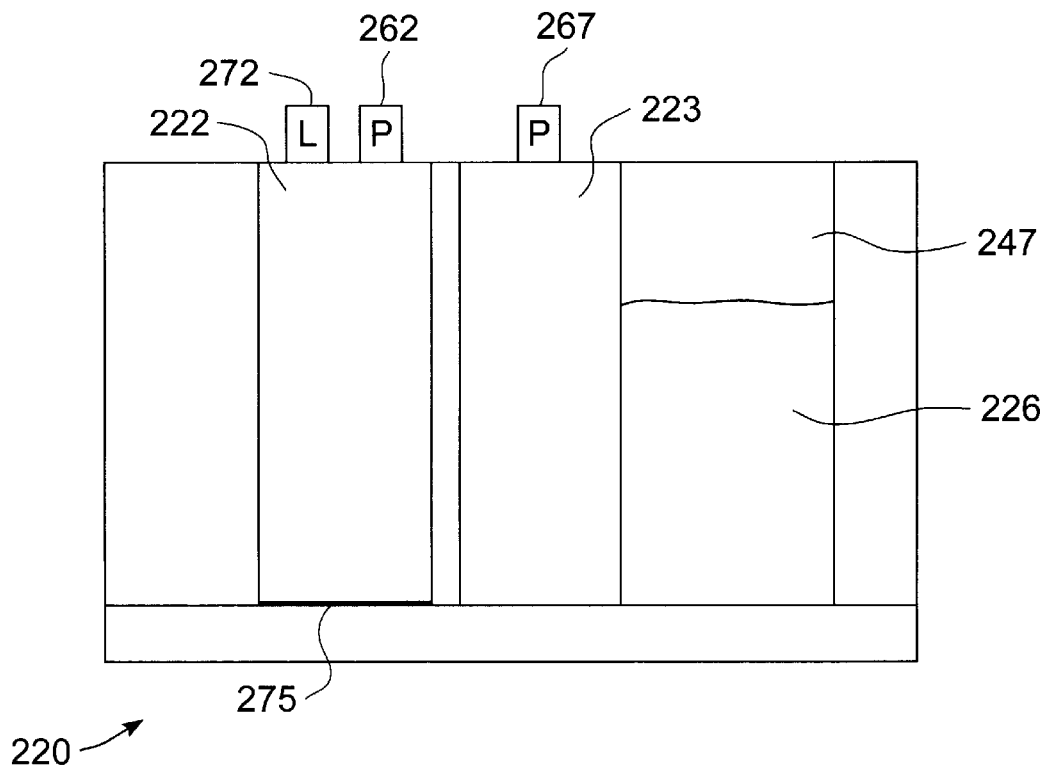

FIGS. 9C and 9D are longitudinal cross-sections of sensor 220 with different photodetector arrangements. In FIG. 9C, a photodetector 232 is placed on the bottom of the first waveguide 222 and a second photodetector 237 is placed on the bottom of second waveguide 223. The sensor has a light source 245 on the top of the first waveguide. Cavity 226 contains the liquid 250, the level of which is sensed by the second photodetector.

In FIG. 9D, a photodetector 262 is placed on the top of the first waveguide and a second photodetector 267 is placed on the top of the second waveguide. A light source 272 is located on the top of the first waveguide, and a reflector 275 is provided on the bottom of the sensor. While FIGS. 9C and 9D provide illustrative examples of the principles of this embodiment of the present invention, many other specific embodiments are possible utilizing alternative shapes for the first and second waveguides, liquid cavity, and the cladding and gap or perforations therein.

Figure 10A:
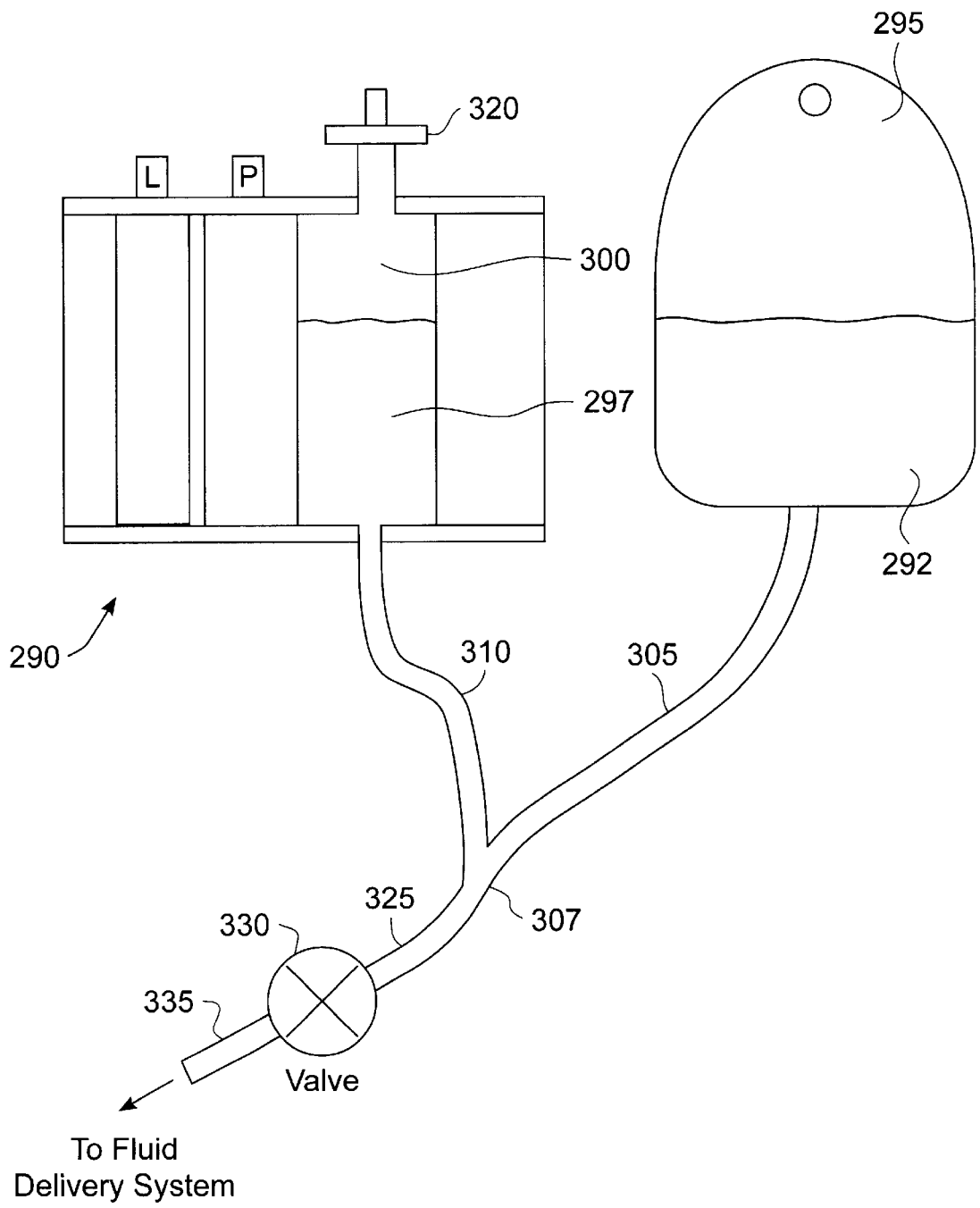
FIG. 10A is a schematic diagram of an embodiment of the present invention where the sensor is combined with an external generic storage vessel to function as a combination level and flow sensor for an intravenous fluid delivery system.

FIG. 10A shows a sensor 290 according to an embodiment of the present invention which provides the ability to measure the level of a liquid 292 in an external generic storage vessel or in this example, an intravenous fluid bag 295. This embodiment is an adaptation of embodiment 270 shown in FIG. 9B (although the embodiment of FIG. 9A could be similarly adapted). Liquid 297 in the sensor storage cavity 300 will rise to the same level as that in bag 295 if a hydraulic connection exists between the storage tank and the bag such as tubing 305 from the bag to a "Y" connector 307 and tubing 310 from the "Y" connector to sensor cavity 300. A vent to the atmosphere with a bacteria-excluding filter 320 is provided to allow the liquid level to change freely within the cavity. Tubing 325 from "Y" connector 307 to a valve 330 provides a mechanism to adjust the flow rate to a desired level so as to meter the delivery of liquid 292 through tubing 335 to the intended site of liquid delivery. The level and flow rate of the liquid can be determined by differentiating the level sensor output (assuming previous calibration) with respect to time using a suitable digital signal processor and providing a visual display for readout of the liquid level and flow rate.

Figure 10B:
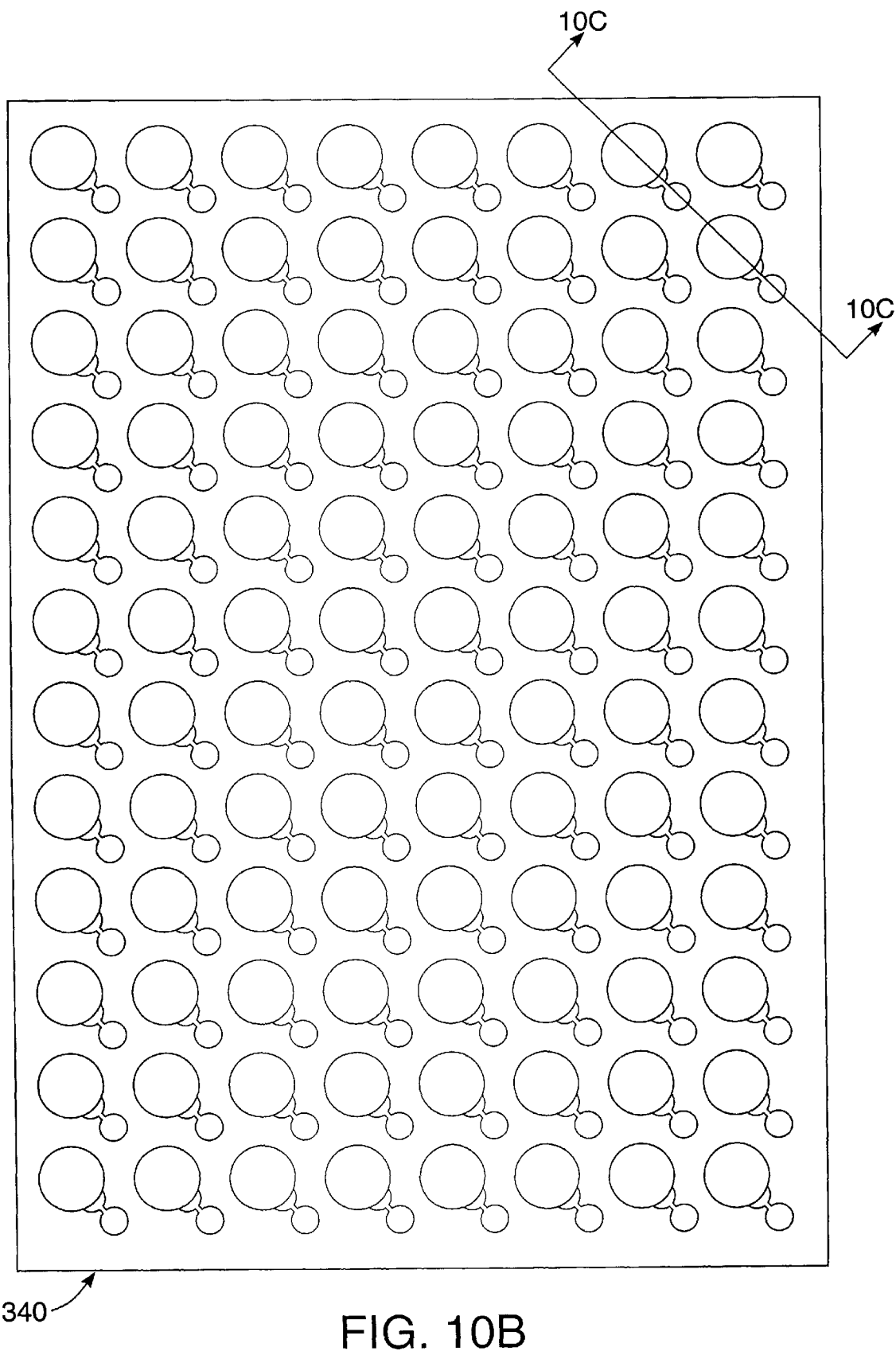

FIG. 10B shows another embodiment of the present invention wherein a plastic micro-well plate 340 having 96 wells, such those in common use in the life science and pharmaceutical research fields, is fabricated with an array of liquid level sensors embedded into the plastic structure of the plate. The sensors are of the type shown in FIG. 9B. This embodiment applies to micro-well plates having any other number of micro-wells and is not limited to a specific number of wells, e.g., 96, 384, 864, 1536, 3072, etc., but rather is limited by the finite space required by the light source and the first waveguide of the present invention.

FIG. 10C shows a cross-section of micro-well plate 340 taken through the line 10C—10C in FIG. 10B, and further shows an external setup for injecting and detecting the light into and from, respectively, a pre-selected sensor and micro-well so as to allow random access readout of the liquid level in any or all of the micro-wells according to the principle of the embodiment of FIG. 9A. The sensor includes first and second waveguides 341 and 342, coupled by a web 343. A light source 344 couples excitation light into the rod-shaped first waveguide (of relatively high index) which subsequently injects light into second waveguide 342 through web 343. The sensor is embedded in the relatively low index material which forms the micro-well plate. For example, the sensor could be made of polystyrene with index 1.58 and the micro-well plate could be made of acrylic with index 1.49. If liquid 345 is present in the micro-well (as shown in the left-hand portion of the figure), a portion of the light traveling in the second waveguide 342 will be coupled into liquid 345 causing a decrease in the signal collected by a photodetector 347 located at the top of second waveguide 342. A measurement of the level of the liquid in the micro-well can therefore be represented by the signal measured from photodetector 347. The right-hand portion of the figure shows the situation with no liquid in the well.

The figure shows a repetition of the light source and photodetectors, which would allow more than one micro-well to be interrogated at a given time. This may be desirable from a throughput point of view, but significant benefits can be achieved even if only one micro-well is interrogated at a time. It is generally contemplated that the mechanism for injecting and detecting the light (i.e., light source 344 and photodetector 347) is part of an instrument into which the allo-plastic micro-well plate is inserted. The instrument would provide for moving the micro-well plate relative to the light source and detector.

Embodiments with Discrete Injection Waveguides

FIG. 11A is a longitudinal cross-section of a sensor 350 according to an embodiment of the present invention wherein the first waveguide 350 consists of a plurality (or bundle) of smaller diameter optical fibers 360 (relative to the overall diameter of the first waveguide), each with successively shorter lengths. Light is coupled into the bundle from a light source 365, reflects off a mirror 370 and is detected at the top surface by a photodetector 375.

FIG. 11B shows another embodiment 380 wherein the orientation of the fiber bundle 382 is inverted with the light source 385 at the bottom and the photodetector 390 at the top surface of the sensor.

FIG. 12 is a longitudinal cross-section of a sensor 400 according to an embodiment of the present invention wherein the first waveguide 405 is fabricated with periodic steps 410 perpendicular to the longitudinal optical axis. As light launched into the first waveguide by the light source 415 encounters each step, the fraction of the light encountering each step is injected into the second waveguide 420. A photodetector 425 detects the light in the second waveguide after it is reflected from the bottom of the sensor by a reflector 430. The reflector can be omitted if the light source and the first waveguide are placed at the bottom of the second waveguide as in FIG. 11B.

The relative lengths of fibers 360 in FIGS. 11A and 11B and the distance between steps 410 in FIG. 12 can be varied to provide a desired response characteristic (e.g., linear, exponential, logarithmic, etc.).

Mode-selective Couplers

Additional embodiments of the present invention include input and output mode-selective couplers to exclude or allow specific modes from entering or exiting the first and/or the second waveguide. Such input and output mode-selective couplers reduce the background signal and allow the second waveguide to be fabricated from a material having a higher index of refraction than the sensed liquid.

Figures 13A, 13B, 13C:
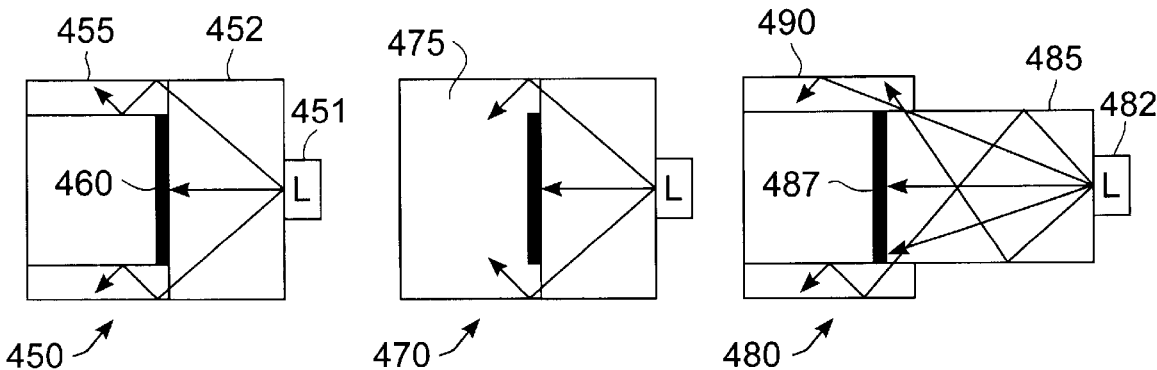
FIGS. 13A–13C show alternative embodiments of a mode-selective coupler at the input to the level sensor according to the present invention.

FIGS. 13A–13C are longitudinal cross-sections of embodiments of input mode-selective couplers. FIG. 13A shows an embodiment of a coupler 450 wherein light from a light source 451 is launched into a rod 452 which is in optical contact with the end of a tube 455. An optically opaque area 460 blocks light traveling at shallow angles whereas light traveling at a steeper range of angles can enter tube 455, which defines the first waveguide of a liquid level sensor constructed using the method of the present invention. FIG. 13B shows an embodiment of a coupler 470 which functions identically to that of FIG. 13A except that the first waveguide of the level sensor is fabricated from a rod 475 rather than a tube. FIG. 13C shows an alternative embodiment of a coupler 480 wherein light from a light source 482 is launched into a rod 485 with an opaque cap 487 on its end. Rod 485 is inserted a short distance into a tube 490 and is optically coupled so as to allow light traveling at a range of steep angles in the rod to pass into the tube while light traveling at shallow angles will be prevented from entering. The rod should be as short as possible to achieve the maximum rejection of shallow angle rays.

In some embodiments, an output mode-selective coupler can be employed to extract low angle modes from the second waveguide and transmit only rays traveling at a steep angles to the photodetector.

Figures 14A, 14B:
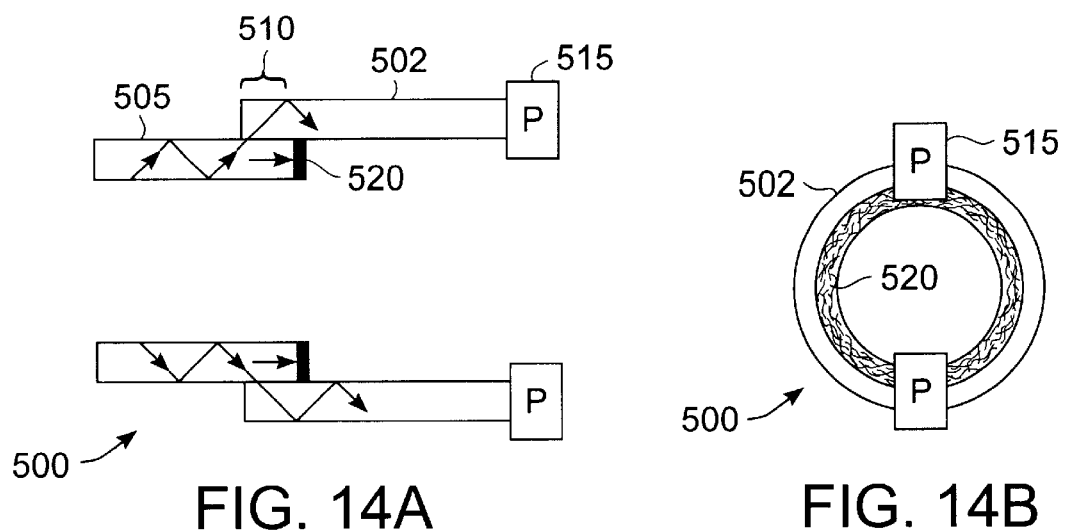
FIGS. 14A–14D show alternative embodiments of mode-selective couplers at the output of the second waveguide of a level sensor according to the present invention.

FIG. 14A is a longitudinal cross-section of an embodiment of an output mode-selective coupler 500. An output mode-coupling tube 502 is positioned to overlap a tube 505 (the second waveguide of a level sensor according to the present invention). The overlap area 510 forms an optical connection between tubes 502 and 505 and thus allows rays traveling at steep angles in tube 505 to enter tube 502 and be transmitted a photodetector 515. The output mode-coupling tube is designed to overlap the second waveguide by the shortest practical distance (usually between 0.2 and 2 times the thickness of the second waveguide) thereby creating an optical interface through which only steep angle rays are allowed to pass. Rays traveling at shallow angles are extracted from the end of the second waveguide by absorption into a ring 520 of opaque material.

Figures 14C, 14D:
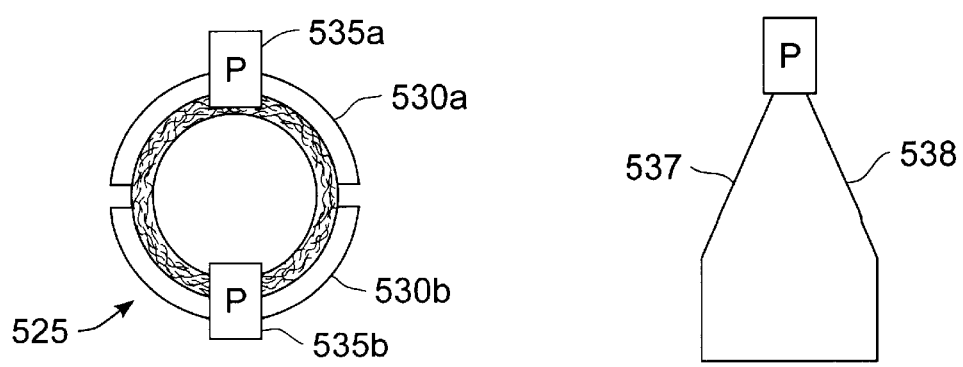

FIG. 14B is a transverse cross-section of coupler 500, and illustrates the fact that one or a plurality of photodetectors can be placed at the end of output mode-coupling tube 502 to collect light coming from the level sensor. FIG. 14C shows an embodiment of a coupler 525 wherein the output mode-coupling tube is split into pieces (530a and 530b in this example) with photodetectors 535a and 535b positioned at the ends of each tube section respectively.

FIG. 14D is a side view of one of the couplers of FIG. 14C and shows an embodiment where the coupler includes tapered edges 537 and 538 (with the taper angles less than the critical angle given by equation (1) where N1 is the index of the coupling tube and N2 is the index of the medium surrounding the coupling tube) which cause the light coming from the second waveguide of the level sensor to be concentrated into the photodetector.

FIG. 15A is an embodiment of an output mode-selective coupler 550 with a focusing lens 552, which efficiently couples a large fraction of the light traveling at steep angles within the second waveguide 555 of a level sensor into a photodetector 557. FIG. 15B shows an embodiment of a coupler 560 where lens 552 of FIG. 15A is replaced by a right circular frustum (truncated cone) 565. The taper angle of frustum 565 is chosen to be less than the critical angle given by equation (1) where N1 is the index of cone material and N2 is the index of the medium surrounding the cone. Light entering cone 565 from the coupling tube 567 is internally reflected at the surface of the cone and concentrated as it is coupled to a photodetector 570.

In some embodiments, two output mode-selective couplers are used to separate steep and shallow rays and simultaneously detect them with two photodetectors so as to derive a signal that is relatively insensitive to light source output changes, waveguide attenuation drift, and temperature drift by combining the signals from the two photodetectors algorithmically (e.g., taking the ratio, etc.).

FIG. 16A shows an embodiment of a dual-mode detection scheme 580 wherein light traveling at shallow angles in the second waveguide 582 of a level sensor according to the present invention is collected in a photodetector 585 positioned at the end of the second waveguide. Light traveling at steep angles is extracted from second waveguide 582 through the optical interface 587 by a mode coupling tube 590 and guided thereafter to a photodetector 592. FIG. 16B shows another embodiment of a dual-mode detection scheme 600, where the mode-selective coupler 605 is shaped and mounted to provide efficient extraction of steep angle rays from the waveguide 607 so as to allow convenient mounting of photodetectors 610 and 612.

Additional Variations and Enhancements

FIG. 17A shows a sensor 620 according to an embodiment of the present invention wherein the light source 625 and the photodetector 627 are mounted in the same plane, possibly on a printed circuit board. A light guide 630 directs a collimated beam from light source 625 to the first waveguide 632 whereupon it travels to the end of the sensor, is reflected into a desired angle by a conical reflector 635, is injected into the second waveguide 640 and is concentrated into photodetector 627 by a conical concentrator 642. FIG. 17B is a top view of sensor 620 illustrating that conical concentrator 642 is fashioned with a cut-out so as to allow clearance for the light guide carrying light from light source 625 to first waveguide 632.

Figure 18:
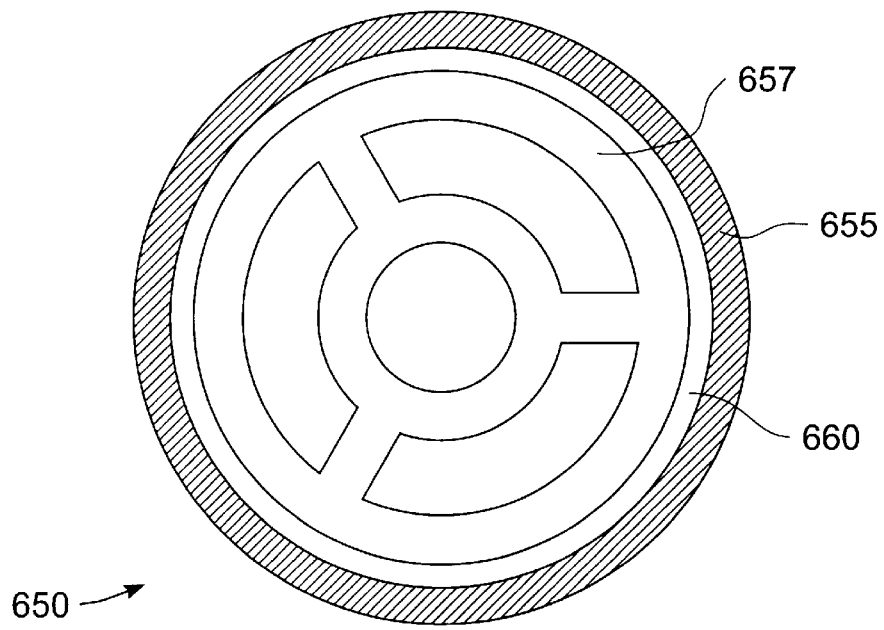
FIG. 18 shows an alternative embodiment of the present invention which includes an outer protective sleeve.

FIG. 18 shows a sensor 650 wherein a sheath of additional optically transparent material 655 around the second waveguide 657 is added to provide improved material compatibility with the environment (e.g., solvents, aggressive substances, etc.). Examples of possible sheath materials are glass, clear Teflon, surface coatings, etc. The sheath is optically coupled to second waveguide 657 with an intervening material 660. It is better if the index of refraction of the sheath is the same or higher than that of the second waveguide, but if it is lower, the device will still function as long as the angle of the light propagating in the outer waveguide is sufficiently above the critical angle associated with the materials of the second waveguide, the sheath, and any intervening materials such as adhesives, optical coupling liquids, gels, and the like.

The present invention approaches the linearization and accuracy problem in the following novel way. The probe is designed for minimum fabrication and assembly cost. The response is required only to be monotonic with level while providing adequate sensitivity, signal-to-noise and signal-to-background ratios over the useful life and full range of the sensor. However, in some applications it may be desired to tailor the response of the sensor to produce a particular response characteristic, e.g., linear, exponential, logarithmic, etc. Since electronics must be provided in any optical level sensor to perform optical-to-electronic signal conversion, the present invention contemplates a number of possible modifications to the sensor construction as well as additional electronics and optics (e.g., simple optical level switches) to tailor the response characteristic and perform calibration. Calibration could be performed with either digital or analog electronics.

It should be noted that if the web elements are designed to provide uniform injection per unit length of light into the second waveguide, then the response will be exponential. By increasing the injection rate near the top the response can be "linearized." In principle a logarithmic rate of injection of light into the second waveguide will produce a linear sensor response.

Figures 19A, 19B:
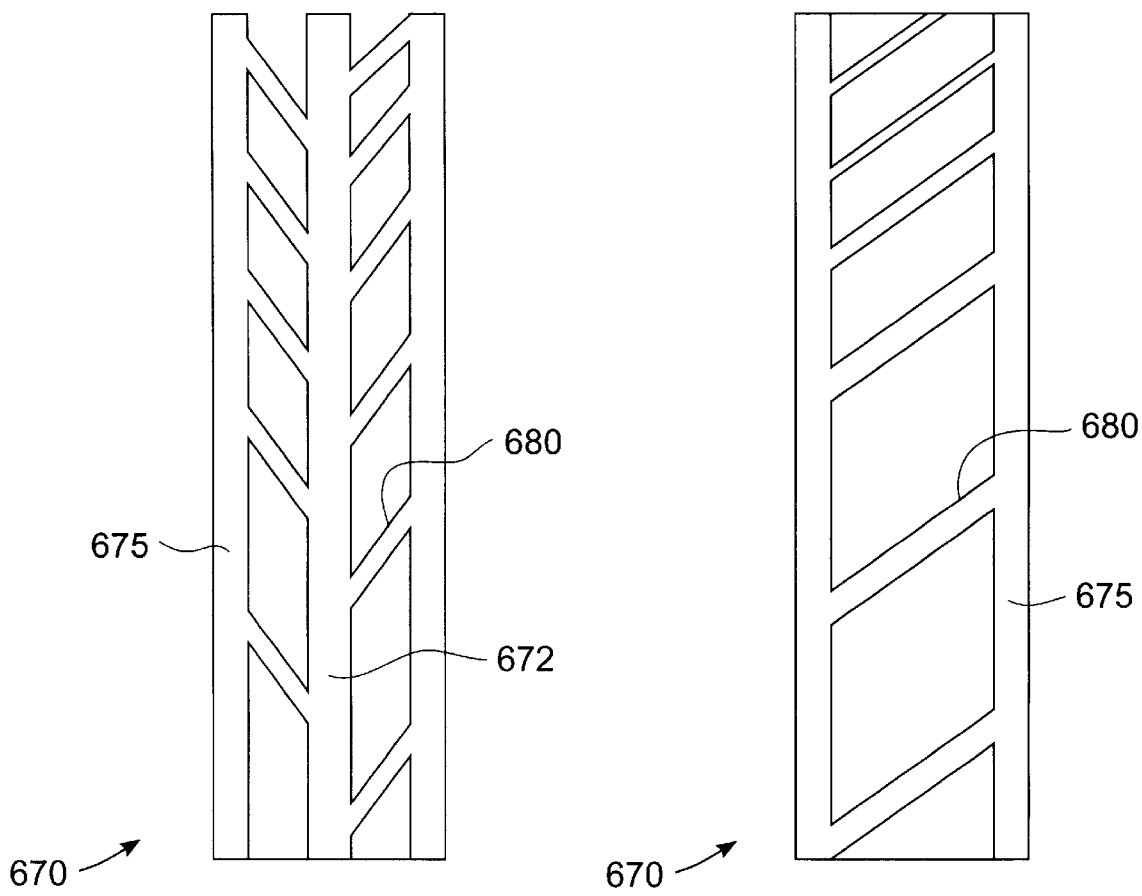
FIG. 19A shows an alternative embodiment of the present invention which includes web portions designed so as to inject light into the second waveguide in such a way to produce a tailored response.
FIG. 19B shows a variation of the embodiment of FIG. 19A wherein the web portion of the sensor spirals around the first waveguide in a "candy striped" fashion.

FIGS. 19A and 19B show a sensor 670 according to an alternative embodiment of the present invention wherein the first waveguide 672 is designed to control the rate of injection of light into the second waveguide 675 in such a way so as to linearize the response by placing the web elements 680 closer together at the top of the sensor and farther apart at the bottom. FIG. 19A is a longitudinal cross-section showing how web elements 680 are oriented so as to inject light traveling at a specific range of ray angles into the second waveguide with the number of web elements per unit length decreasing from the top to the bottom of the sensor. FIG. 19B is a cut-away side view which exposes the spiraled nature of the web elements. Here it can be seen that the density of web elements can be described as a decreasing web spiral frequency from the top to the bottom of the sensor.

Calibration

The sensor can be calibrated in several ways. First, the response of the sensor can be measured at several points and stored in a look-up table in a nonvolatile RAM or programmable memory device. The sensor response between the calibration points can be fit to a polynomial which passes through the calibration points. The background signal can be subtracted out when the tank is full. A simple optical level switch can be added to detect the full condition so that the sensor can self-calibrate whenever the tank is filled. Since the shape of the response curve near the bottom of the sensor is changed when different termination schemes are used, a particular termination can be chosen to give a desired curve shape. In addition, a particular shape can be molded into the bottom "cap" which would cause the signal level to change precipitously when the liquid level drops below the end of the sensor thus providing a tank low warning. In a specific application, if the sensor response is found to vary significantly over time due to environmental factors such as temperature variation, fouling, or light source amplitude drift, there are numerous methods whereby calibration can be established and maintained. Some of these are described below.

Figure 20A:
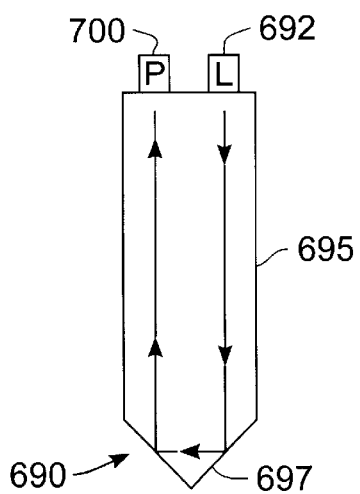
FIG. 20A shows an example of a prior art discrete level sensor.

FIG. 20A shows a prior art discrete liquid level sensor 690 wherein a light source 692 injects collimated light into a rod-shaped waveguide 695 having a conical tip 697 with a cone angle of 45°. If the conical tip is immersed in liquid a with an index of refraction relatively close to that of the waveguide, almost all the excitation light will pass out of the waveguide and into the liquid with the result that the signal at a photodetector 700 will be relatively low. If the conical tip is dry, then total internal reflection will occur within the internal cone and the collimated excitation light will be returned to photodetector 700 and produce a relatively large signal. An electronic circuit is generally configured to compare the photodetector signal to a pre-determined reference and provide a binary indication (high or low) representing whether the liquid is at (or above) or below the level of the conical tip.

Figure 20B:
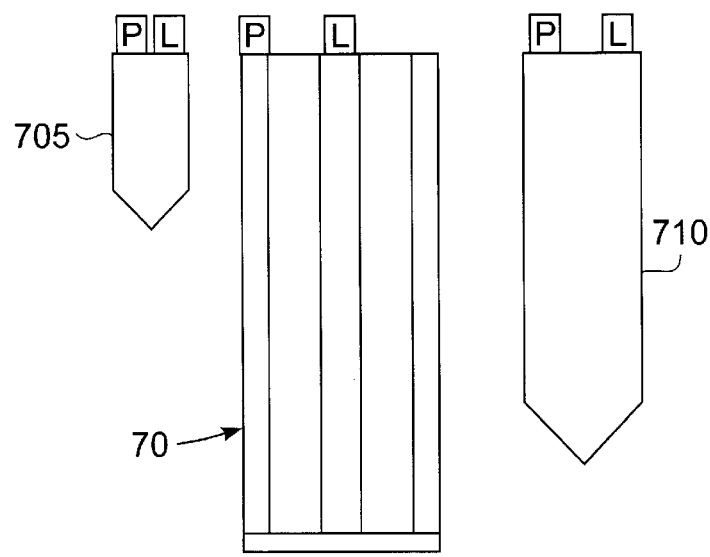
FIGS. 20B–20D are longitudinal cross-sections of an embodiment of the present invention with additional structures for discrete level calibrators.

It is envisioned that the invention described herein may utilize an external discrete level switch of the type described above or it may employ a novel design, such as a photodiode embedded or for example, mounted inside one of the air cavities of an extrusion. FIG. 20B shows how a sensor (such as sensor 70 of FIG. 5A) according to the present invention can be combined with one or more, in this case two, discrete level sensors 705 and 710 such as the one described above and in FIG. 20A to provide an in-situ calibration.

Figure 20C:
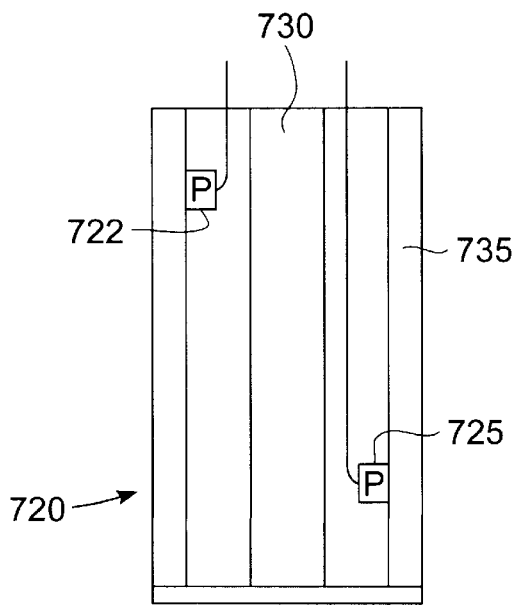

FIG. 20C shows a sensor 720 according to an embodiment of the present invention wherein discrete level sensors are embedded within the body of the level sensor. Here, photodetectors 722 and 725 are embedded or located within an air cavity between the first waveguide 730 and second waveguide 720. The light collecting surface of each photodetector is in optical contact with second waveguide 735 and is oriented facing toward the liquid so as to detect the presence of light traveling in the second waveguide. If the liquid level is above the level of the photodetector, than the light traveling in the second waveguide will escape into the liquid and the photodetector signal will be low. If the liquid level is below the level of the photodetector, than some of the light traveling in the second waveguide will be collected by the photodetector and the signal will be high.

Figure 20D:
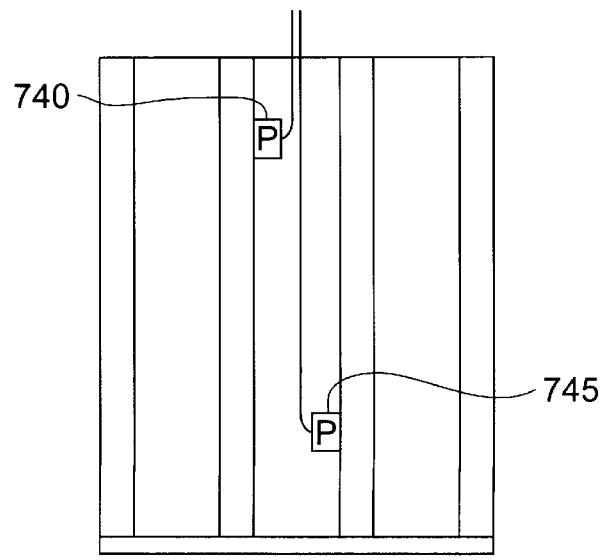

In FIG. 20D, photodetectors 740 and 745 are placed in optical contact with the inside of a tubularly shaped first waveguide facing outward and preferably oriented over a web element. As in FIG. 20C, the photodetectors in FIG. 20D will provide a discrete indication of the liquid level for the purposes of in-situ and possibly real-time calibration. It should be clear that although two discrete level sensors were shown in FIGS. 20B and 20C, more or fewer than two discrete level sensors can be used in this embodiment of the present invention.

Performance Characteristics

For fabrication or other reasons, the first waveguide may itself be tubular as in the embodiment shown in FIG. 21A. When reference is made to injecting light into the first waveguide, it is generally understood that the light is injected to travel within the wall portion, not the central hollow portion. However, there may be applications where it is worthwhile to have at least some of the injected light enter the first waveguide along its length from within the hollow portion of the tube. For example, this could provide an extra design degree of freedom for controlling, as a function of the location along the sensor, the amount of light available to leak into the second waveguide through the web portion(s).

FIG. 21A shows an embodiment 750 wherein a light source 752 couples light into a light guide 755 from which the steep angle rays are coupled into a first waveguide 760 by an input mode-selective coupler 770. A mirror 775 located at the bottom of the sensor reflects the light traveling in the first waveguide back towards the top of the sensor, whereupon it is injected into a second waveguide 780 along its length. Light traveling upward in the second waveguide at steep rays angles is coupled to the photodetector by an output mode-selective coupler 785.

The liquid level sensor 750 of FIG. 21A or any other embodiment of the present invention can be mounted in a tank by way of a flange 790 which compresses a sealing element 795 (an "O"-ring or other appropriate gasket) against the second waveguide of the sensor. It is preferable to use a scaling element that is fabricated from a material with an index of refraction less than that of the second waveguide to prevent extraction of light from the second waveguide by the sealing element. Sealing elements with higher index of refraction than the second waveguide can be used, but some light will be lost from the second waveguide. An alternative to a low index sealing element is to reflect light back into the second waveguide at the sealing interface using reflective coating or thin strip of material with a reflective coating on it applied to the sensor exterior surface.

FIGS. 21B and 21C illustrate the functional relationship between the optical power traveling in the first and second waveguides and the total distance traveled by the excitation light. FIG. 21B shows that the optical power level in the first waveguide decreases with distance traveled due to injection into the second waveguide. At the level of the liquid, the power in the first waveguide drops suddenly due to the fact that the light traveling in the second waveguide that was previously being coupled back into the first waveguide now escapes into the liquid. The optical power in the first waveguide continues to decrease due to injection into the first waveguide. The mirror at the bottom of the sensor effectively doubles the total distance traveled by the excitation light.

FIG. 21C shows that the amount of optical power injected into the second waveguide through the web portion(s) and remaining trapped in the second waveguide increases in the portion of the second waveguide that is not in contact with the liquid. After reaching the liquid most or all of the light in the portion of the second waveguide that is in contact with the liquid is lost through the liquid-contacting surface. However, since the web mechanism injects light into the second waveguide over the its entire length, the optical power in the second waveguide begins to rise as it travels toward the photodetector beginning at the point where the second waveguide no longer contacts the liquid.

Figure 1A:
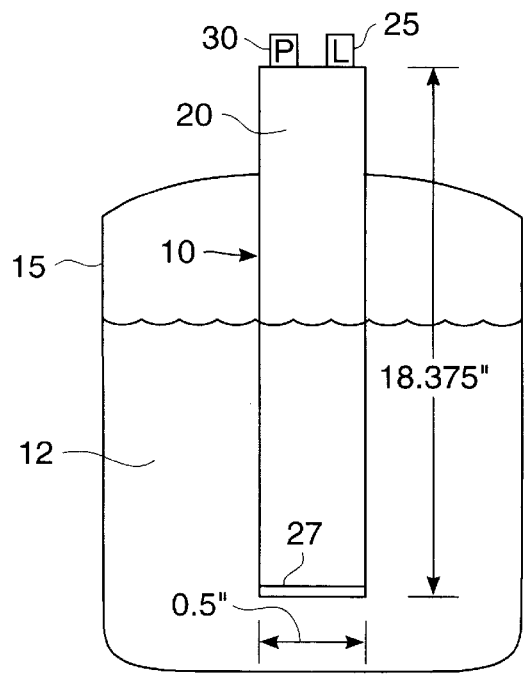
FIG. 1A is a schematic diagram of a prior art optical sensor.
Figure 1B:
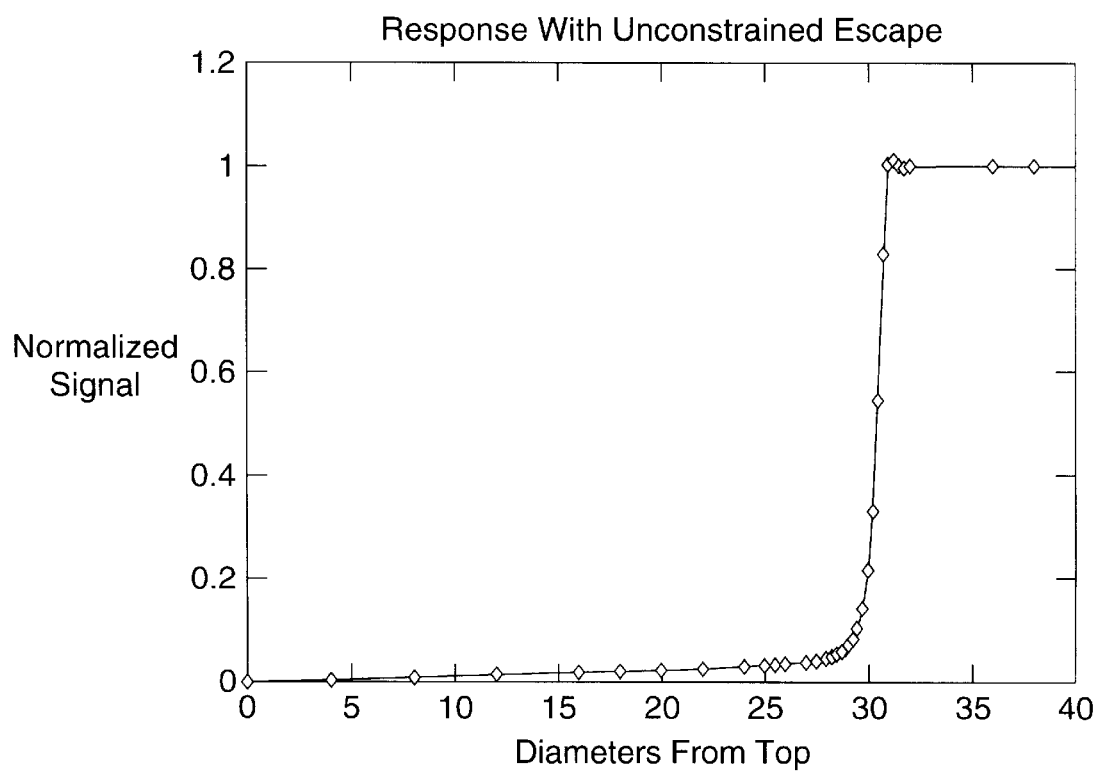
FIG. 1B is an actual data plot of the output signal from the sensor of FIG. 1A as a function of the number of sensor diameters from the top.
Figure 1C:
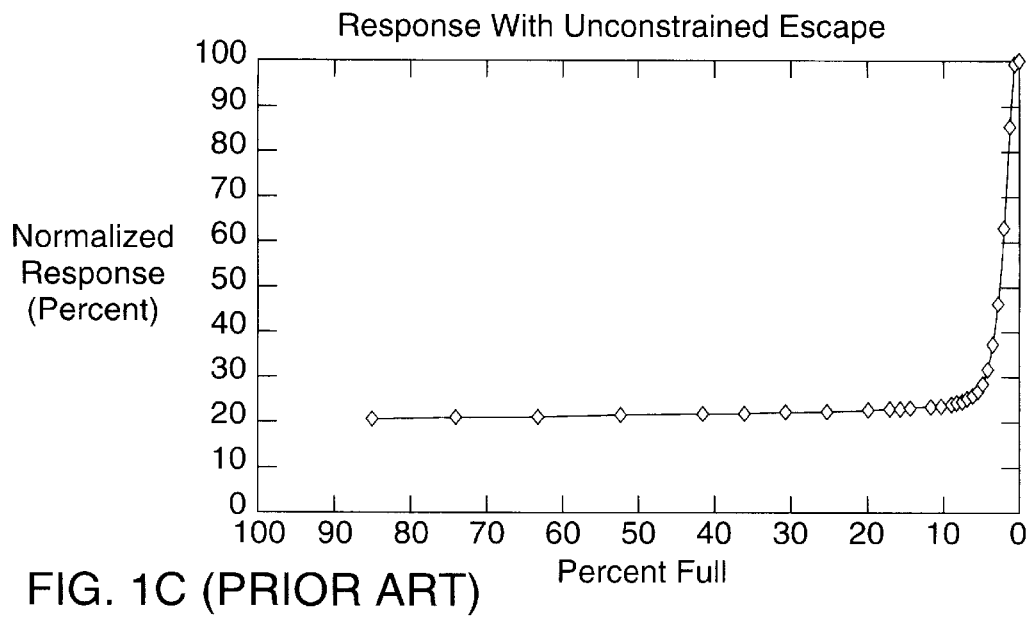
FIG. 1C is an actual data plot of the output signal from the sensor of FIG. 1A with respect to the tank-full percentage.
Figure 2:
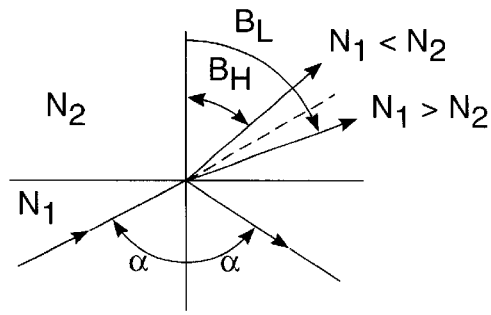
FIG. 2 is a schematic diagram illustrating reflection and refraction of a light beam at a dielectric interface.
Figure 3:
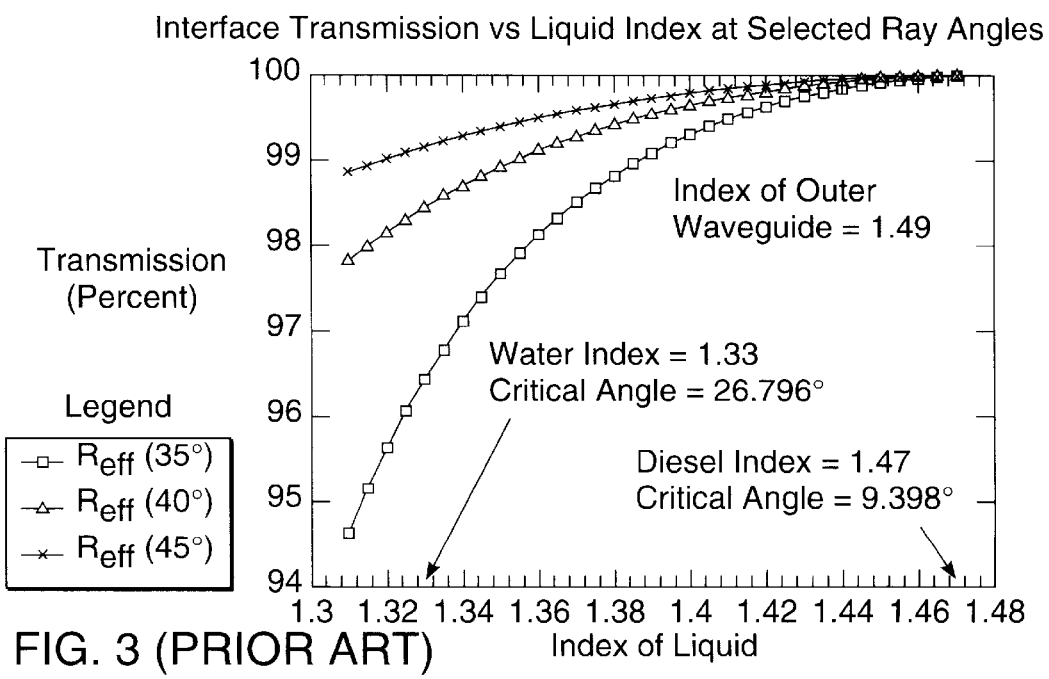
FIG. 3 is a plot of the transmission at the waveguide/liquid interface for a liquid level sensor waveguide with light propagating at several selected angles.
Figure 22:
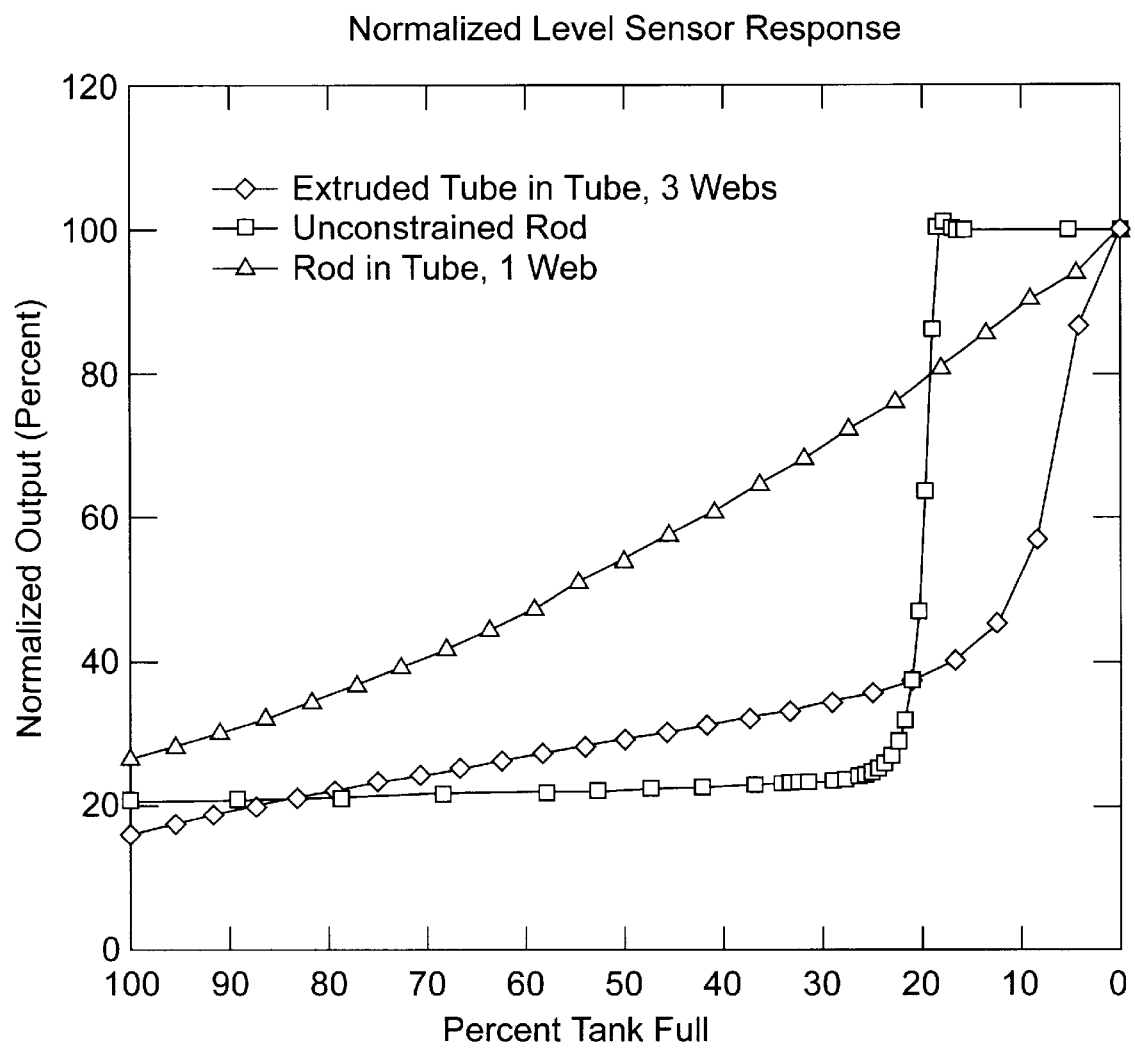
FIG. 22 is a set of actual data taken from several optical level sensors which allow comparison of optical liquid level sensors constructed in accordance with the prior art and with embodiments of the present invention.

FIG. 22 shows actual data normalized to allow comparison of the response of liquid level sensors constructed according to the present invention to the generic prior art sensor described above and in FIG. 1. In FIG. 22, data are shown for the prior art level sensor described in FIG. 1, for the level sensor described above and shown in FIG. 21A with an actual length of 24" and outside diameter of 0.635", and for a level sensor having a 0.375" diameter rod-shaped first waveguide connected through a single web to a 0.75" diameter tube 22" in length. All of the above sensors were fabricated from acrylic with an index of refraction of 1.49. The liquid was diesel fuel estimated to have an index of refraction of 1.47.

From the response curves, it is clear that both sensors constructed according to the present invention exhibit a much smoother and more usable response characteristic than the prior art sensor over the length of the sensor. The sensor constructed with the solid rod as the first waveguide has a more graceful monotonic response but has a higher background since mode-selective couplers were not used in this case. Although the sensor constructed with a tube for the center waveguide exhibits a rapid signal drop at the bottom end of the sensor, it was fabricated from a single piece of acrylic plastic formed by a low cost extrusion process. It is believed that by applying the principles and methods described in this application, embodiments of liquid level sensors according to the present invention can be designed to take advantage of less expensive manufacturing and assembly techniques which will enable performance comparable to the solid core sensor to be achieved.

Embodiments of the present invention can be designed to detect various ranges of liquid level variation, for example from a fraction of an inch to many feet. The resolution of the sensor has been determined empirically to be on the order a few thousandths of an inch and is limited by liquid viscosity and wetting non-uniformity and time variability since the optical signal has a signal-to-noise ratio in excess of 1000:1.
Additional Applications There are many potential applications for optical level sensing technology, including low cost sensors for the measurement of medical reagents, process chemical, high-purity chemicals, diesel fuel level in trucks and busses as well as off-road agricultural, construction, and military applications. The sensor technology's relatively low cost and high reliability offer a clear competitive advantage. Further, there is considerable room for improvement in automotive fuel sensor performance and reliability as well as a need for monitoring other automotive fluid levels at the right price point and thus potential opportunities for the optical level sensor technology in automotive markets.

The current status of the technology is that prototypes have been constructed which demonstrate an adequate sensor response in diesel and a construction that is compatible with the low cost manufacturing strategy mentioned above.

Materials and constructions for the optical level sensor should withstand the anticipated thermal, physical shock and vibration, and chemical stresses over the expected life of the sensor. Since the performance of the sensor depends on the optical properties of the sensor materials and the fluid in the tank, the interactions between the two must be well understood or at least well characterized. For example, several plastics and other low cost materials mentioned above are currently under consideration as potential sensor construction materials.

Since the sensor is inherently low cost and, unlike float-based sensors, has minimal errors due to hysteresis and requires very little space in a tank, it should be possible to employ multiple sensors in a single tank to accurately measure liquid level, even when a vehicle is on a slope. Furthermore, if the sensor can accurately detect liquid level at all inclinations, it should also be possible to measure both the inclination and the rate of fuel consumption (or leakage) from a vehicle or ground storage tank. Preliminary experiments have shown that the device has a very high resolution (between 0.01" and 0.001") for a 24" sensor. This level of resolution should be adequate to provide sensitive and accurate flow rate measurements. The sensor design should scale well and be suitable for use in large storage tanks.

It is also anticipated that applications in vehicle fluid monitoring other than diesel (or other fuels) can be developed. For example, oil, radiator fluid, transmission fluid, steering fluid, and windshield washer fluid levels might also be economically detected. One can envision the development of a liquid level monitoring network and display system that could provide the vehicle operator with important information on the status of various fluids. Furthermore, this same concept could be applied to the monitoring of fuel and other liquid storage facilities. Inventories could be monitored and leaks or theft could be detected.

This technology can also be extended to detect stratified layers, for example, of water and fuel. Automatic detection of water in fuel tanks is clearly important in certain critical applications such as avionics. In fact, numerous applications for optical level sensing exist in aviation and marine applications. Inclination-independent sensor arrays are of great potential utility in airplane fuel storage tanks. Improved accuracy in fuel gauging systems will provide benefits in both in safety and economy. Optical level sensors, properly deployed in airplanes could reduce the risk of running out of fuel by accurately detecting both the fuel level and presence of water.

Embodiments of the present invention can be designed to detect various ranges of liquid level variation, for example, from a fraction of a millimeter to a kilometer. The physical size of embodiments of the present invention can be scaled for liquid containers with diameters as small as a fraction of a millimeter. Embodiments of the present invention can be scaled to measure liquid volumes as small as a fraction of a microliter. There is no known upper limit on the tank diameter or total volume. The resolution of liquid level sensors constructed according to the present invention has been determined empirically to be on the order of 10 microns and is limited by liquid viscosity, wetting non-uniformity, surface tension effects, and time variability since the optical signal has a signal-to-noise ratio in excess of 1000:1.

As in all areas of technology, it is anticipated that new optical materials will be developed with improved chemical resistance, higher optical clarity, longer useful lifetimes, larger operating and storage temperature ranges, and higher strength. In addition, it is anticipated that materials will be developed with the above attributes with greater choices in the index of refraction (preferably lower indices of refraction). That being the case, level sensors designed and fabricated according to the principles and methods of present invention will be inherently able to take advantage of the properties of such anticipated new materials.

Conclusion

In conclusion, it can be seen that the present invention provides an elegant approach to the design of optical level sensors. The present invention greatly improves the linearity and accuracy, reduces the signal to background ratio and drift, and achieves a high level of chemical compatibility while maintaining a relatively low manufacturing cost.

While the above is a complete description of specific embodiments of the invention, various modifications, alternative constructions, and equivalents may be used. Therefore, the above description should not be taken as limiting the scope of the invention as defined by the claims.

What is claimed is:

1. A method for detecting a level of a liquid, the method comprising:

providing a waveguide extending from a first end to a second end along an axis, the axis extending into said liquid, said waveguide having a surface for contacting said liquid such that light traveling in said waveguide at certain angles relative to said axis undergoes total internal reflection from said surface where said surface is not in contact with said liquid but undergoes significant transmission through said surface into said liquid where said surface is in contact with said liquid;

injecting light into said waveguide so as to travel in a direction having a component along said axis, said light being injected at locations along a significant length of said waveguide;

detecting an amount of light reaching one of said ends of said waveguide; and converting a signal representing said amount of light, so detected, to a representation of said level of liquid.

2. The method of claim 1 wherein said injecting light into said waveguide includes:

providing an additional waveguide;

injecting light into said additional waveguide near a first end thereof so as to travel in a direction having a component along said axis; and coupling a fraction of the light propagating along said additional waveguide into said waveguide over an extended portion of said waveguide.

3. The method of claim 1 wherein said injecting light into said additional waveguide includes:

limiting the light, so injected, to only some modes so that the light coupled into said waveguide is substantially devoid of light propagating in directions within a range of angles relative to said axis.

4. The method of claim 1 wherein said detecting light includes:

limiting the light, so detected, to substantially exclude light propagating in directions within a range of angles relative to said axis.

5. An optical sensor for detecting a level of a liquid, the sensor comprising:

a waveguide extending along an axis from a first end to a second end, said waveguide having a surface for contacting said liquid such that light traveling in said waveguide at certain angles relative to said axis undergoes total internal reflection from said surface where said surface is not in contact with said liquid but undergoes significant transmission through said surface into said liquid where said surface is in contact with said liquid;

means for injecting light into said waveguide so as to travel in a direction having a component along an axis extending from said first end to said second end, said light being injected at multiple locations along a significant length of said waveguide; and an optical detector coupled to said waveguide at an end thereof;

whereby said light injected into said waveguide travels along said waveguide with a portion reaching said optical detector, said portion depending on an amount of light that is transmitted through said surface due to said surface contacting said surrounding liquid, said amount of light depending on said level of surrounding liquid.

6. The optical sensor of claim 5 wherein said means for injecting light into said waveguide comprises:

an additional waveguide;

a light source injecting light into said additional waveguide near a first end thereof so as to travel in a direction having a component along said axis; and means for coupling a fraction of the light propagating along said additional waveguide into said waveguide over an extended portion of said waveguide.

7. The optical sensor of claim 6 wherein;

said waveguide is tubular; and said additional waveguide is located within said waveguide.

8. The optical sensor of claim 6 wherein;

said additional waveguide is located in a side-by-side relationship said waveguide.

9. An optical sensor for detecting a level of a liquid, the sensor comprising:

a first waveguide extending along an axis, said first waveguide having an outer surface;

a second waveguide surrounding and outwardly spaced from said first waveguide, said second waveguide having inner and outer surfaces;

said first and second waveguides extending from respective first ends to respective second ends;

a web portion optically coupled to said outer surface of said first waveguide and said inner surface of said second waveguide to provide a mechanism for a fraction of light propagating along said first waveguide to couple into said second waveguide;

an optical source coupled to said first waveguide; and an optical detector coupled to said second waveguide;

said optical source and said optical detector being disposed so that light from said optical source travels along said first waveguide with a fraction being coupled into said second waveguide through said web portion, and said light coupled into said second waveguide travels along said second waveguide with a portion reaching said optical detector, said portion depending on an amount of light that is transmitted through said outer surface due to said outer surface contacting said surrounding liquid, said amount of light depending on said level of surrounding liquid.

10. The optical sensor of claim 9 wherein:

said optical source and said optical detector are located at said respective first ends of said first and second waveguides; and said first waveguide is provided with a reflector at said second waveguide's second end to direct light toward said optical detector.

11. The optical sensor of claim 9 wherein:

said optical source is located at said first end of said first waveguide; and said optical detector is located at said second end of said second waveguide.

12. The optical sensor of claim 9 wherein:

said outer surface of said first waveguide is cylindrical; and said second waveguide is annular with cylindrical inner and outer surfaces.

13. The optical sensor of claim 9 wherein said web is one of a plurality of webs.

14. The optical sensor of claim 9 wherein said web is the only web.

15. The optical sensor of claim 9, and further comprising an additional optical detector coupled to said first waveguide.

* * * * *